United States Patent
Humphrys et al.

(10) Patent No.: US 9,005,802 B2
(45) Date of Patent: Apr. 14, 2015

(54) ELECTRODE ASSEMBLY WITH HYBRID WELD

(75) Inventors: Seth M. Humphrys, Golden Valley, MN (US); David J. Buendorf, Maple Grove, MN (US); Hailing Zhao, Maple Grove, MN (US)

(73) Assignee: Medtronic, Inc., Minneapolis, MN (US)

( * ) Notice: Subject to any disclaimer, the term of this patent is extended or adjusted under 35 U.S.C. 154(b) by 630 days.

(21) Appl. No.: 13/332,551

(22) Filed: Dec. 21, 2011

(65) Prior Publication Data

US 2013/0164582 A1   Jun. 27, 2013

(51) Int. Cl.
*H01M 2/26* (2006.01)
*H01M 10/04* (2006.01)

(52) U.S. Cl.
CPC .......... *H01M 2/26* (2013.01); *H01M 10/0431* (2013.01); *H01M 10/0409* (2013.01)

(58) Field of Classification Search
None
See application file for complete search history.

(56) References Cited

U.S. PATENT DOCUMENTS

| | | |
|---|---|---|
| 1,861,006 A | 5/1932 | Goodman |
| 3,153,180 A | 10/1964 | Bellmore |
| 3,615,834 A | 10/1971 | Sundberg |
| 3,734,778 A | 5/1973 | Huf et al. |
| 3,791,868 A | 2/1974 | Compton et al. |
| 4,028,138 A | 6/1977 | Dey |
| 4,064,725 A | 12/1977 | Hug et al. |
| 4,092,386 A | 5/1978 | Rigstad |
| 4,099,401 A | 7/1978 | Hug et al. |
| 4,158,300 A | 6/1979 | Hug et al. |
| 4,212,179 A | 7/1980 | Juergens |
| 4,332,868 A | 6/1982 | Anand et al. |
| 4,476,624 A | 10/1984 | Klein et al. |
| 4,863,815 A | 9/1989 | Chang et al. |
| 4,879,190 A | 11/1989 | Lundsgaard |
| 4,930,327 A | 6/1990 | Aidlin et al. |
| 4,966,822 A | 10/1990 | Johnston |

(Continued)

FOREIGN PATENT DOCUMENTS

| | | |
|---|---|---|
| DE | 26 45 863 | 4/1977 |
| EP | 1 357 619 | 10/2003 |

(Continued)

OTHER PUBLICATIONS

International Search Report PCT/US2011/051685 (4 pgs.).

(Continued)

*Primary Examiner* — Carlos Barcena
*Assistant Examiner* — Wojciech Haske

(57) ABSTRACT

An electric storage battery including a jelly roll type electrode assembly having a mandrel. The mandrel includes a positive portion, negative portion and removable portion. The mandrel has two faces with grooves dimensioned to accommodate positive and negative feedthrough pins. Electrodes are welded to the mandrel using an ultrasonic weld to the face on which the electrodes are attached. An additional weld is made to at least one ultrasonic weld using a through-mandrel laser weld, incident on the opposite face from which the ultrasonic weld. The laser melts the mandrel such that molten mandrel material fills the area under the foil at the area of the ultrasonic weld, the surface area of the foil being significantly increased by knurls formed by ultrasonic welding. Electrodes are wrapped around the mandrel using the removable portion to wind the mandrel. The mandrel allows tighter wrapping of the jelly roll assembly increasing battery miniaturization.

33 Claims, 15 Drawing Sheets

(56) References Cited

U.S. PATENT DOCUMENTS

| | | |
|---|---|---|
| 4,975,095 A | 12/1990 | Strickland et al. |
| 5,045,086 A | 9/1991 | Juergens |
| 5,047,068 A | 9/1991 | Stoklosa |
| 5,323,527 A | 6/1994 | Ribordy et al. |
| 5,326,652 A | 7/1994 | Lake |
| 5,486,215 A | 1/1996 | Kelm et al. |
| 5,509,942 A | 4/1996 | Dodge |
| 5,521,021 A | 5/1996 | Alexandres et al. |
| 5,532,075 A | 7/1996 | Alexandres et al. |
| 5,549,717 A | 8/1996 | Takeuchi et al. |
| 5,603,737 A | 2/1997 | Marincic et al. |
| 5,677,078 A | 10/1997 | Juergens et al. |
| 5,700,299 A | 12/1997 | Clark |
| 5,791,041 A | 8/1998 | Miyata et al. |
| 6,051,038 A | 4/2000 | Howard et al. |
| 6,190,426 B1 | 2/2001 | Thibault et al. |
| 6,391,068 B2 | 5/2002 | Yoshida et al. |
| 6,420,065 B1 | 7/2002 | Yde-Andersen et al. |
| 6,443,999 B1 | 9/2002 | Cantave et al. |
| 6,485,859 B1 | 11/2002 | Szyszkowski |
| 6,627,344 B2 | 9/2003 | Kang et al. |
| 6,670,071 B2 | 12/2003 | Skinlo et al. |
| 6,692,542 B1 | 2/2004 | Kashiyama et al. |
| 6,841,296 B2 | 1/2005 | Ng et al. |
| 6,923,837 B2 | 8/2005 | Longhi, Jr. et al. |
| 6,951,576 B1 | 10/2005 | Takeuchi |
| 7,041,413 B2 | 5/2006 | Tsukamoto et al. |
| 7,060,387 B2 | 6/2006 | Kim et al. |
| 7,070,881 B2 | 7/2006 | Kishiyama et al. |
| 7,205,068 B2 | 4/2007 | Fong et al. |
| 7,378,181 B2 | 5/2008 | Skinlo |
| 7,410,512 B2 | 8/2008 | Tsukamoto et al. |
| 7,416,811 B2 | 8/2008 | Nakahara et al. |
| 7,432,012 B2 | 10/2008 | Tsukamoto et al. |
| 7,435,507 B2 | 10/2008 | Ohata et al. |
| 7,442,465 B2 | 10/2008 | Kim et al. |
| 7,481,852 B2 | 1/2009 | Longhi, Jr. et al. |
| 7,488,553 B2 | 2/2009 | Tsukamoto et al. |
| 7,501,201 B2 | 3/2009 | Ishikawa et al. |
| 7,569,305 B2 | 8/2009 | Skinlo et al. |
| 7,578,898 B2 | 8/2009 | Le Gal |
| 7,601,461 B2 | 10/2009 | Skinlo et al. |
| 7,632,603 B2 | 12/2009 | Tsukamoto et al. |
| 7,666,545 B2 | 2/2010 | Oh et al. |
| 7,879,486 B2 | 2/2011 | Tsukamoto et al. |
| 2003/0003356 A1 | 1/2003 | Tsukamoto et al. |
| 2004/0049908 A1 | 3/2004 | Tsukamoto et al. |
| 2004/0053115 A1 | 3/2004 | Skinlo |
| 2004/0053116 A1 | 3/2004 | Skinlo |
| 2004/0053118 A1 | 3/2004 | Tsukamoto et al. |
| 2004/0053119 A1 | 3/2004 | Tsukamoto et al. |
| 2004/0142237 A1 | 7/2004 | Asano |
| 2004/0214076 A1 | 10/2004 | Tsukamoto et al. |
| 2005/0042516 A1 | 2/2005 | Oh et al. |
| 2005/0123824 A1 | 6/2005 | Ishikawa et al. |
| 2005/0174092 A1 | 8/2005 | Dougherty et al. |
| 2006/0035147 A1 | 2/2006 | Lam et al. |
| 2006/0073380 A1 | 4/2006 | Kim et al. |
| 2006/0085971 A1 | 4/2006 | Andrews et al. |
| 2006/0123622 A1 | 6/2006 | Guy |
| 2006/0222943 A1 | 10/2006 | Fujikawa et al. |
| 2006/0263686 A1 | 11/2006 | Zhao |
| 2007/0059590 A1 | 3/2007 | Hayashi et al. |
| 2007/0059599 A1 | 3/2007 | Rubino et al. |
| 2007/0138905 A1 | 6/2007 | Axelrod et al. |
| 2007/0180686 A1 | 8/2007 | Woo |
| 2008/0026283 A1 | 1/2008 | Park et al. |
| 2008/0026293 A1 | 1/2008 | Marple et al. |
| 2008/0138699 A1 | 6/2008 | Kim et al. |
| 2008/0248375 A1 | 10/2008 | Cintra et al. |
| 2009/0208832 A1 | 8/2009 | Beard |
| 2010/0273036 A1 | 10/2010 | Marple et al. |

FOREIGN PATENT DOCUMENTS

| | | |
|---|---|---|
| JP | 8 050915 | 2/1996 |
| JP | 9 120822 | 5/1997 |
| JP | 2000 348754 | 12/2000 |
| WO | WO 90/16089 | 12/1990 |
| WO | WO 2008/018207 | 2/2008 |

OTHER PUBLICATIONS

International Search Report PCT/US2011/029322 (3 pgs.).
International Search Report PCT/US2011/029320 (3 pgs.).
International Search Report PCT/US2011/029323 (3 pgs.).
International Search Report PCT/US2011/029325 (3 pgs.).
International Search Report PCT/US2011/051687 (4 pgs.).

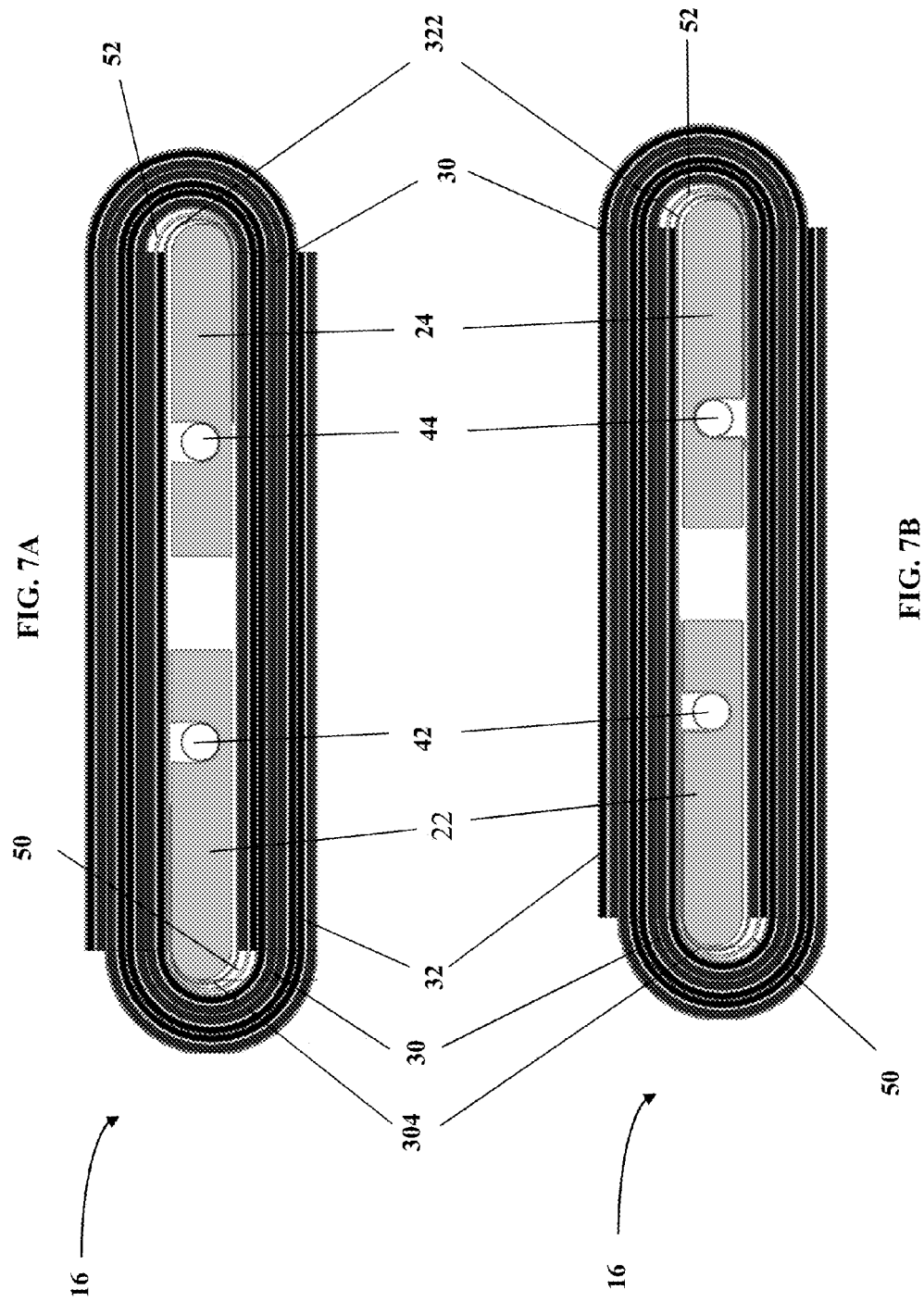

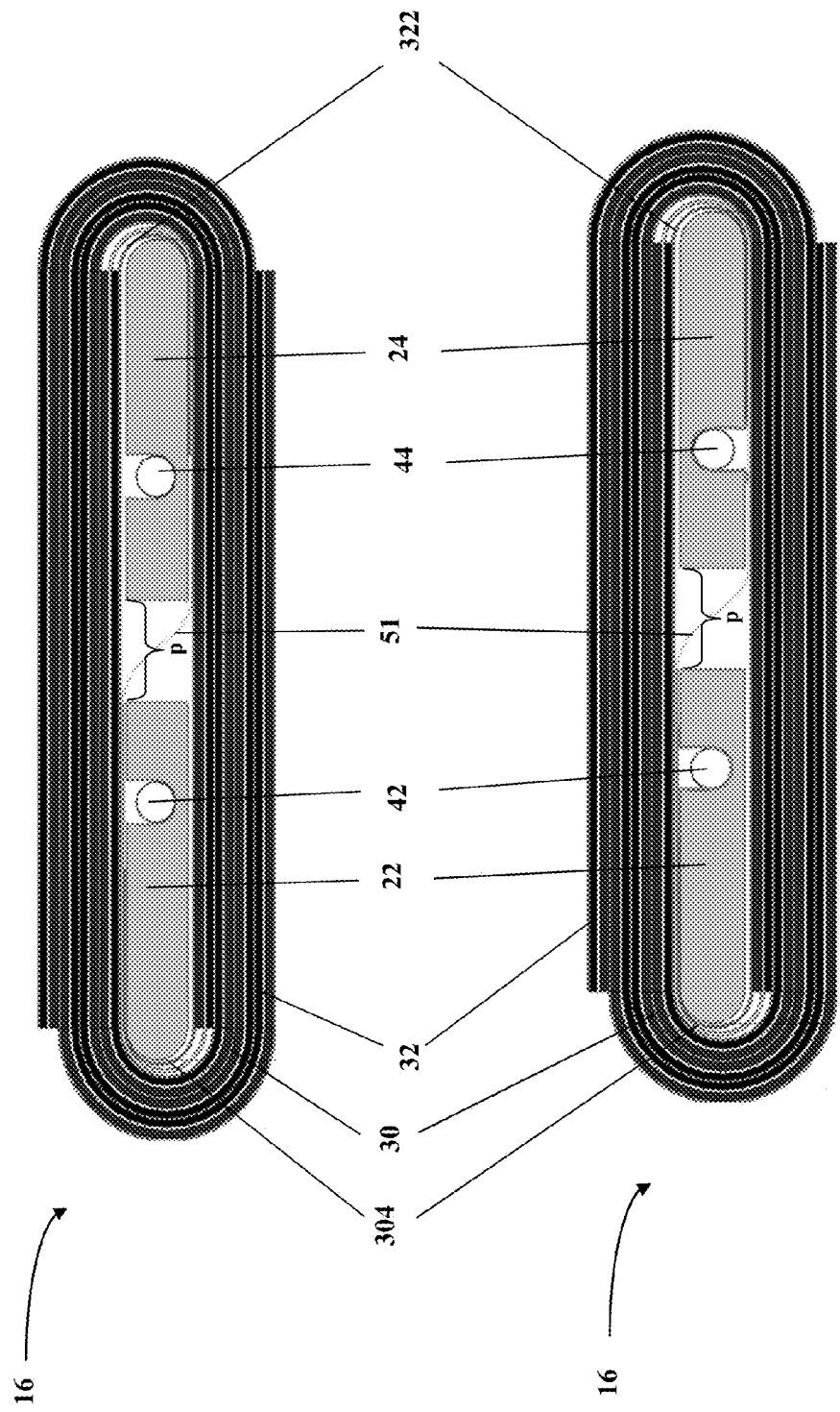

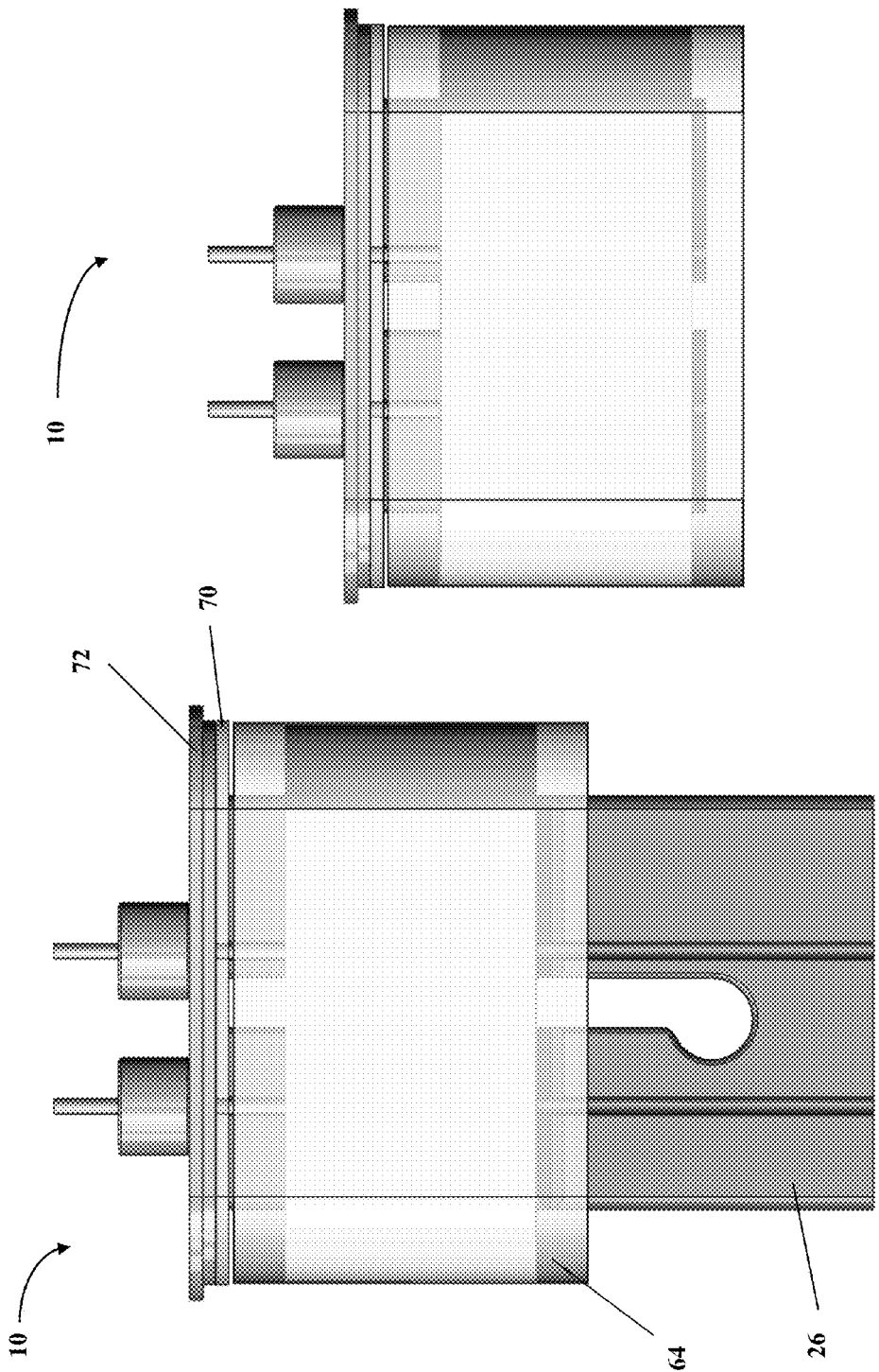

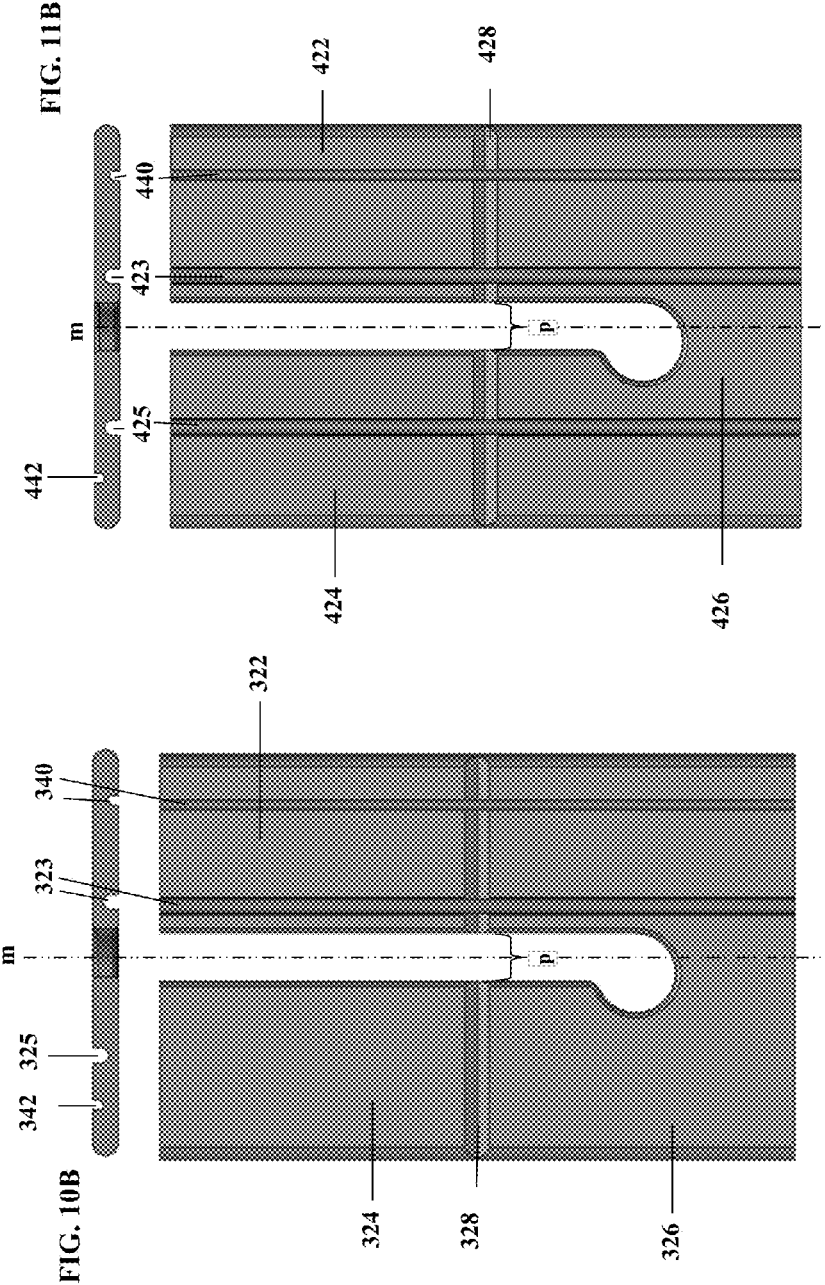

ELECTRODE ASSEMBLY WITH HYBRID WELD

CROSS-REFERENCE TO RELATED APPLICATIONS

None.

FIELD OF THE INVENTION

The invention relates to a jelly roll-type electric battery assembly having an integrated mandrel with a hybrid electrode weld allowing for increased compactness and to a method of manufacture.

BACKGROUND OF THE INVENTION

Batteries for medical devices have demanding requirements. They should be small, have a long life, high power output, low self-discharge rate, compact size and high reliability. The need for miniaturization while maintaining or increasing output means that as much of the battery footprint as possible should be used for power storage resulting in the concomitant elimination of dead space. However, while the elimination of dead space should result in greater miniaturization, it also results in a greater difficulty of assembly due to the increasingly small size of the component parts.

Traditionally, jelly roll type batteries have been made by using a mandrel to wrap electrodes around. Once wrapped, the mandrel is removed providing a jelly roll wrapped electrode assembly for use in a battery. However, removal of the mandrel from the core of the jelly roll inherently presents the potential of damaging the jelly roll due to the possibility of pulling the core of the jelly roll out with the mandrel. Therefore, the jelly roll should not be wrapped tight to avoid this problem. Conversely, a loosely wrapped jelly roll wastes space and decreases battery capacity and power due to size constraints. More recently, jelly roll storage batteries have been made using a rod-shaped, non-conductive, non-deformable core around which electrodes are wrapped. Conductive tabs are added to each electrode to complete the circuit.

U.S. Pat. No. 7,442,465 to Kim et al., discloses a rechargeable battery which has a non-deformation core. Once the positive and negative electrodes are wound around the core, conductive tabs are attached to the electrodes and the core serves to prevent deformation of the jelly roll, but does not conduct current.

U.S. Provisional Patent Application No. 60/348,665 to Nakahara et al. describes a feedthrough pin that is directly connected to an inner end of an electrode. The pin extends from the jelly roll and through the battery case and functions as a battery terminal. The feedthrough pin fits into a slotted 'C'-shaped mandrel. The positive electrode is conductively connected to the pin which fits within the 'C'-shaped mandrel. As the positive electrode is wound, a separator is inserted between the feedthrough pin/mandrel and the positive electrode. A negative electrode is inserted between the separator and the pin/mandrel. The separator and negative electrode are held in the jelly roll by the tension created between the feedthrough pin/mandrel and the positive electrode. After winding, a metal tab is welded to the negative electrode and the tab contacts the battery case endcap to complete the circuit.

Both of the aforementioned batteries require the placement of at least one tab on an electrode to complete the circuit during or after winding the electrodes. In either case, the passive connection of one of the electrodes to the case is required for the circuit to be completed.

Therefore, a need exists for an improved electrode assembly.

SUMMARY OF THE INVENTION

Therefore, in various embodiments, the invention provides an electric storage battery including a jelly roll type electrode assembly having an integrated mandrel is provided. The mandrel includes a positive portion, negative portion and removable portion. The mandrel has two faces with grooves dimensioned to accommodate positive and negative feedthrough pins. Electrodes are welded to the mandrel using an ultrasonic weld to the face on which the electrodes are attached. An additional weld is made to at least one ultrasonic weld using a through-mandrel laser weld, incident on the opposite face from which the ultrasonic weld. The laser melts the mandrel such that molten mandrel material fills the area under the foil at the area of the ultrasonic weld, the surface area of the foil being significantly increased by imprints of knurls formed by ultrasonic welding. One result is the molten mandrel material also melting the foil which has a lower melting temperature allowing a mixing of the two materials. The electrodes are wrapped around the mandrel using the removable portion to wind the mandrel. The mandrel allows tighter wrapping of the jelly roll assembly increasing battery miniaturization.

Therefore, in various exemplary embodiments the invention includes, an electrode assembly comprising a mandrel having a first face and a second face, comprising a positive portion, a negative portion and one or more removable portions; a positive electrode; a negative electrode; a positive feedthrough pin; and a negative feedthrough pin; wherein the positive portion and the negative portion are connected by one or more removable portions; wherein the positive feedthrough pin is conductively connected to the positive portion and the negative feedthrough pin is conductively connected to the negative portion; wherein the positive electrode is attached to the positive portion and the negative electrode is attached to the negative portion; wherein one or both electrodes are conductively connected to the mandrel by an ultrasonic weld from the same face of the mandrel to which the one or both electrodes are attached; and wherein one or both electrodes are conductively connected to the mandrel by a laser weld from the opposite face of the mandrel from which the one or both electrodes are attached.

In some embodiments according to the invention the ultrasonic weld results in one or more knurls on the surface of the electrode in contact with the mandrel. In various embodiments the laser weld is formed about the one or more knurls. In some embodiments, the positive portion and/or the negative portion have a groove configured to accept the feedthrough pins. In these embodiments, the positive and negative feedthrough pins are independently selected from steel, platinum, aluminum, titanium, vanadium, niobium, molybdenum, platinum-iridium, and copper and their alloys.

In still other exemplary embodiments the invention provides a method of preparing an electrode assembly comprising: providing a mandrel having a first face and a second face and comprising a positive portion and a negative portion connected by one or more removable portions; providing a positive electrode; providing a negative electrode; providing a positive feedthrough pin; providing a negative feedthrough pin; conductively connecting the positive feedthrough pin to the positive portion and the negative feedthrough pin to the negative portion; attaching the positive electrode to a face of the positive portion by ultrasonic welding from the same face of the mandrel to which the electrode is attached; attaching the negative electrode to a face of the negative portion by ultrasonic welding from the same face of the mandrel to which the electrode is attached; attaching the positive electrode to a face of the positive portion by laser welding from the opposite face of the mandrel to which the electrode is attached; and attaching the negative electrode to a face of the negative portion by laser welding from the opposite face of the mandrel to which the electrode is attached.

In these embodiments of the invention, the ultrasonic welding provides one or more knurls. In some embodiments, the laser welding provides molten mandrel material about the one or more knurls. In various embodiments of the invention, the method of making the electrode assembly includes providing a groove configured to accept the positive feedthrough pin on the positive portion on a face of the mandrel. In these embodiments, the positive feedthrough pin is conductively connected in the groove on the positive portion. In various embodiments, the method according to the invention also provides providing a groove configured to accept the negative feedthrough pin on the negative portion on a face of the mandrel. In these embodiments, the negative feedthrough pin is conductively connected in the groove on the negative portion.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be apparent from the description, as set forth hereinafter.

BRIEF DESCRIPTION OF THE FIGURES

Various exemplary embodiments of the compositions and methods according to the invention will be described in detail, with reference to the following figures wherein:

FIG. 2A is a side-plan view of the mandrel. FIG. 2B is a top-plan view of the mandrel of FIG. 2A;

FIGS. 7A, 7B, 7C and 7D are schematic, top-plan views of four jelly roll electrode assemblies using different mandrels to make an interconnect joint according to the invention;

FIGS. 8A and 8B show a battery made using the coiled electrode assembly made using a mandrel according to the invention. FIG. 8A shows the electrode assembly in the battery case before the removable portion is detached. FIG. 8B shows the completed battery with the removable portion detached and the electrode assembly ready to be sealed in the battery case;

FIGS. 10A and 10B illustrate a separate embodiment of a mandrel useful in making an interconnect according to the invention. This embodiment of the interconnect joint uses a mandrel having a separate stud pin for conductively connecting the positive and negative electrodes. FIG. 10A is a side-plan view showing a mandrel with the location for a groove including a welding site for a stud pin used to complete the connection between the mandrel and the positive and negative electrode pins. FIG. 10B is a top-plan view of the mandrel shown in FIG. 10A;

FIGS. 11A and 11B illustrate another embodiment of a mandrel useful in making an interconnect according to the invention. FIG. 11A is a side-plan view of the mandrel according to the invention and FIG. 11B is a top-plan view of the same mandrel. This embodiment of the interconnect joint uses a mandrel having separate grooves for stud pins for conductively connecting the positive and negative electrodes;

DETAILED DESCRIPTION OF THE EXEMPLARY EMBODIMENTS

In General

Figure 1:
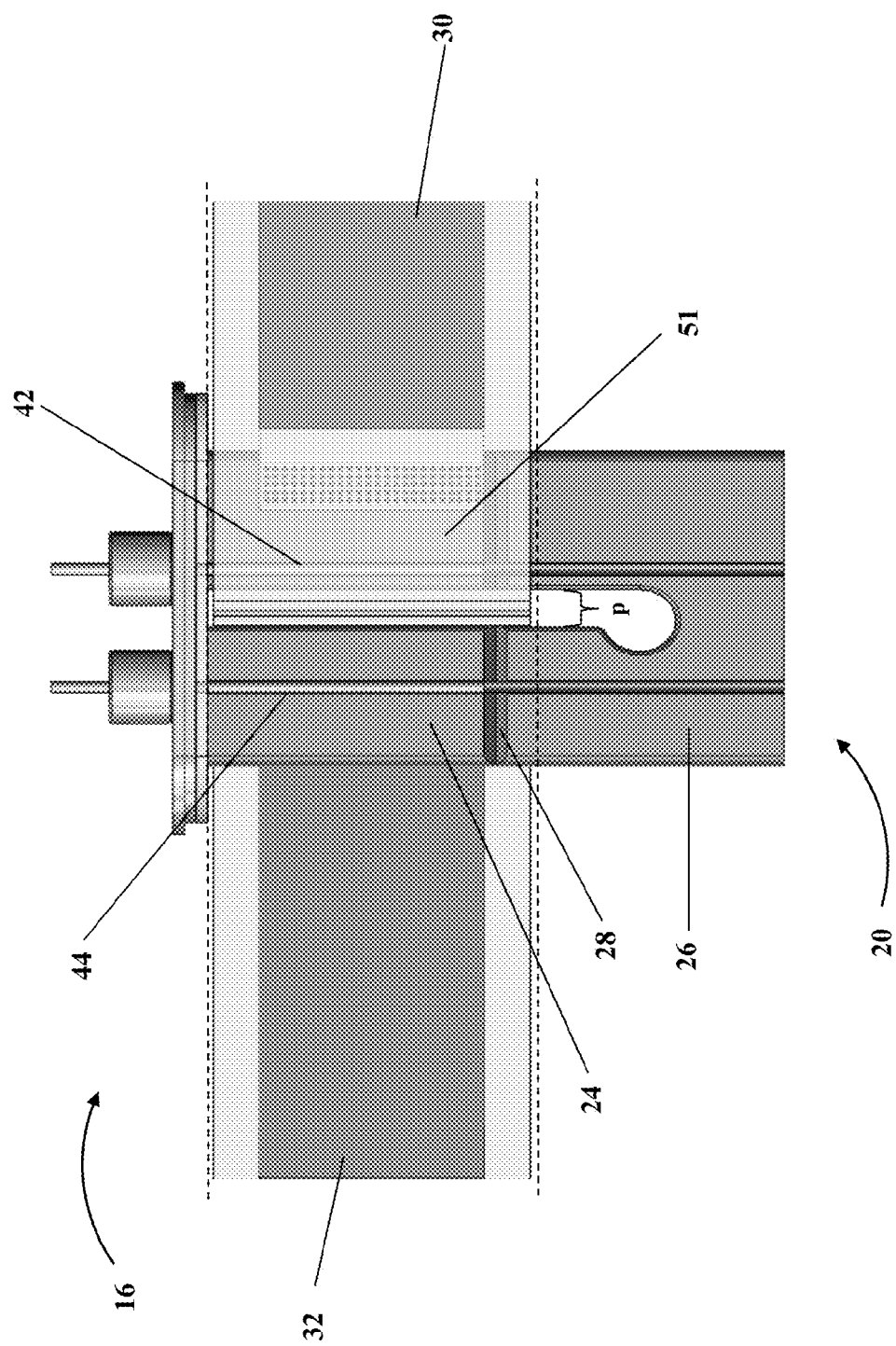
FIG. 1 is a schematic diagram of one embodiment of an electrode assembly made using a mandrel according to the invention. In this embodiment, the feedthrough pins are on the same side face of the mandrel.

It must be noted that as used herein and in the appended claims, the singular forms "a", "an" and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

As used herein, the term "mandrel" means an interior core at least a portion of which can be an integral part of the electrode assembly. The term "interconnect joint" refers to a conductive connection between the electrical components of a battery including a mandrel. While the mandrel may, itself not be conductive, those parts of the electrode assembly required for an electric current, including, at least, positive and negative electrodes and positive and negative feedthrough pins are conductively connected on the mandrel. In addition, the term "electrode" is used to refer to an electrode substrate that can be coated with an active material. The electrode can include a current collecting substrate in the form of multiple "plates" or panels conductively connected to each other. Alternatively, the electrode comprises a substrate in the form of a strip of thin conductive material such as a foil. When the electrode is formed using a foil or thin conductive strip as a substrate, the electrode can be considered an "electrode strip".

As used herein the terms "heat sealed" and "heat sealer" refer to conventional methods known in the art in which a machine applies heat to seal a material such as a thermoplastic material. Of the several types of heat sealers, one is a continuous heat sealer that applies a continuous heat. A continuous heat device or sealer can be constructed using a cartridge heater that is inserted into an appropriate size opening in a block, such as metal or ceramic, having a predetermined shape and desirable thermal properties. A second type of heat sealer is an impulse heat sealer. Generally, an impulse heat sealer uses a stationary element (such as a nichrome wire) that is heated by passing a current through it for a period of time.

The invention and the various features and advantageous details thereof are explained more fully with reference to the non-limiting embodiments that are illustrated in the accompanying drawings and detailed in the following description. Descriptions of well known components and processing techniques are omitted so as not to unnecessarily obscure the invention in detail but such descriptions are, nonetheless, included in the disclosure by incorporation by reference of the citations discussed. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

The Invention

The present invention provides a mandrel useful in making a jelly roll electrode assembly and an electric storage battery. The mandrel includes a positive portion, a negative portion and one or more removable portions adjacent to the positive and/or negative portion(s). A passage is provided between the positive and negative portions. The mandrel can be planar having two faces with a groove on each of the positive and negative portions. The grooves can be on the same or opposite faces of the mandrel. The grooves are dimensioned to accommodate positive and negative feedthrough pins.

The positive and negative electrodes and the positive and negative feedthrough pins can be conductively connected to the mandrel when used to make an electrode assembly. One or more separators can be used to insulate the electrodes. For example, a separator can be passed through the passage of the mandrel so as to be juxtaposed alongside both the positive and negative electrodes. The removable portion(s) can be used as a handle to rotate mandrel, electrodes and one or more separators. Rotation of the mandrel wraps the electrodes and one or more separators around the mandrel to provide a jelly roll electrode assembly. The jelly roll assembly can be secured by heat sealing one or more protruding ends of the one or more separators with heat.

Referring now to FIG. 1, one embodiment of an electrode assembly according to the invention is illustrated. FIG. 1 illustrates an electrode assembly 16 including a conductive mandrel 20 having a positive portion (obscured by separator 51) and a negative portion 24, positive and negative electrodes 30 and 32 and positive and negative feedthrough pins 42 and 44. Mandrel 20 further includes removable portion 26 and a breakaway notch 28. As illustrated, positive electrode 30 and negative electrode 32 can be conductively connected to the conductive mandrel 20 on opposite faces while feedthrough pins 42 and 44 can be conductively connected in place on the same face of the mandrel thereby creating the interconnect joint. In the embodiment shown, positive electrode 30 and the negative electrode 32 can be conductively connected by welding electrodes 30 and 32 to a flat surface of the mandrel 20. In this embodiment, a single separator 51 can be interwoven between positive and negative portions 22 and 24 of mandrel 20 through passage "p" to provide electrode assembly 16.

It should be appreciated that the mandrel can be formed of any conductive material. For example, the mandrel can be formed of stainless steel or aluminum. Alternatively, the mandrel can be made from pure titanium or titanium alloy such as grade 5 or grade 23, nickel, copper, vanadium, their alloys and combinations thereof.

While the mandrel can be made using any appropriate process, in one aspect the mandrel can be made using electric discharge machining (EDM). Alternatively, the mandrel can be made by metal extrusion or by injection molding depending on the needs of the battery and the composition of the mandrel. The grooves for the feedthrough pins can be made in the mandrel by machining, etching, or other suitable methods to provide a groove.

The width of mandrel 20 can be from about 0.2 to about 0.5 inches, more particularly from about 0.25 to about 0.4 inches and most particularly from about 0.3 to about 0.35 inches. Generally, the length of the mandrel ranges from about 0.5 inches to about 1 inch, more particularly from about 0.6 to about 0.8 inches and most particularly from about 0.7 to about 0.75 inches. The thickness of the mandrel ranges from about 0.01 to about 0.05 inches, more particularly from about 0.015 inches to about 0.03 inches and most particularly from about 0.02 to about 0.027 inches.

Electrodes 30 and 32 can vary in size, shape and length. Generally the electrode can be a foil or other thin malleable conductive substrate. In various embodiments, the foil can be in the form of a metal foil such as, for example, aluminum, steel, silver, copper, nickel, titanium, vanadium, and alloys thereof. The length of the electrodes can range from about 2 inches to about 20 inches, particularly from about 4 inches to about 18 inches and most particularly from about 6 inches to about 16 inches. The width of the electrodes can range from about 0.1 to about 2 inches, more particularly from about 0.2 to about 1.75 inches and most particularly from about 0.3 to about 1.5 inches. The thickness of the electrodes can vary from about 0.003 inches to about 0.04 inches, in particular from about 0.004 to about 0.03 inches and most particularly from about 0.005 to about 0.025 inches.

The electrodes can vary in composition depending on the battery chemistry being used and the mandrel can be optimized for such.

Suitable separator material can be any non-conductive material such as polyethylene, polypropylene and layered combinations thereof. The separator generally has a larger width and length than the electrode(s) it covers so as to fully encase the electrode(s). Suitable separators have a length of from about 4 inches to about 36 inches, in particular from about 8 inches to about 34 inches and most particularly from about 12 inches to about 30 inches and widths of from about 0.2 inches to about 2 inches, in particular from about 0.3 inches to about 1.75 inches and most particularly from about 0.4 inches to about 1.5 inches. Suitable thicknesses for separators range from about 0.0008 inches to about 0.004 inches. Generally, separator 51 can be sized appropriately to extend beyond the bottom portion of positive and negative portions 30 and 32 after removal of removable portion 26.

Feedthrough pins can be sized to fit within the grooves and can be made of any electrically conductive material. For example, feedthrough pins 42 and 44 can be made of steel, platinum, aluminum and titanium, vanadium, and alloys thereof. In some embodiments, the feedthrough pins can be made of an alloy such as, for example, platinum-iridium such as 90Pt/10Ir. The length of the positive and negative feedthrough pins can range from about 0.4 to about 1 inches in length, more particularly from about 0.5 to about 0.75 inches and most particularly from about 0.5 to about 0.7 inches. The diameter of the feedthrough pins can vary and can be from about 0.005 to about 0.3 inches, in particular from about 0.01 to about 0.025 inches and most particularly from about 0.01 to about 0.015 inches. The feedthrough pins extend outside of the battery case and can be cut to length as required.

The phrase "removable portion" refers to a portion of the mandrel that can be detached from the remainder of the mandrel. This can be accomplished by scoring a groove deep enough to allow the portion to be "snapped off" from the remainder of the mandrel. Alternatively, the removal portion can be detached by cutting, breaking, tearing or clipping the portion from the remainder of the mandrel.

Figure 2:
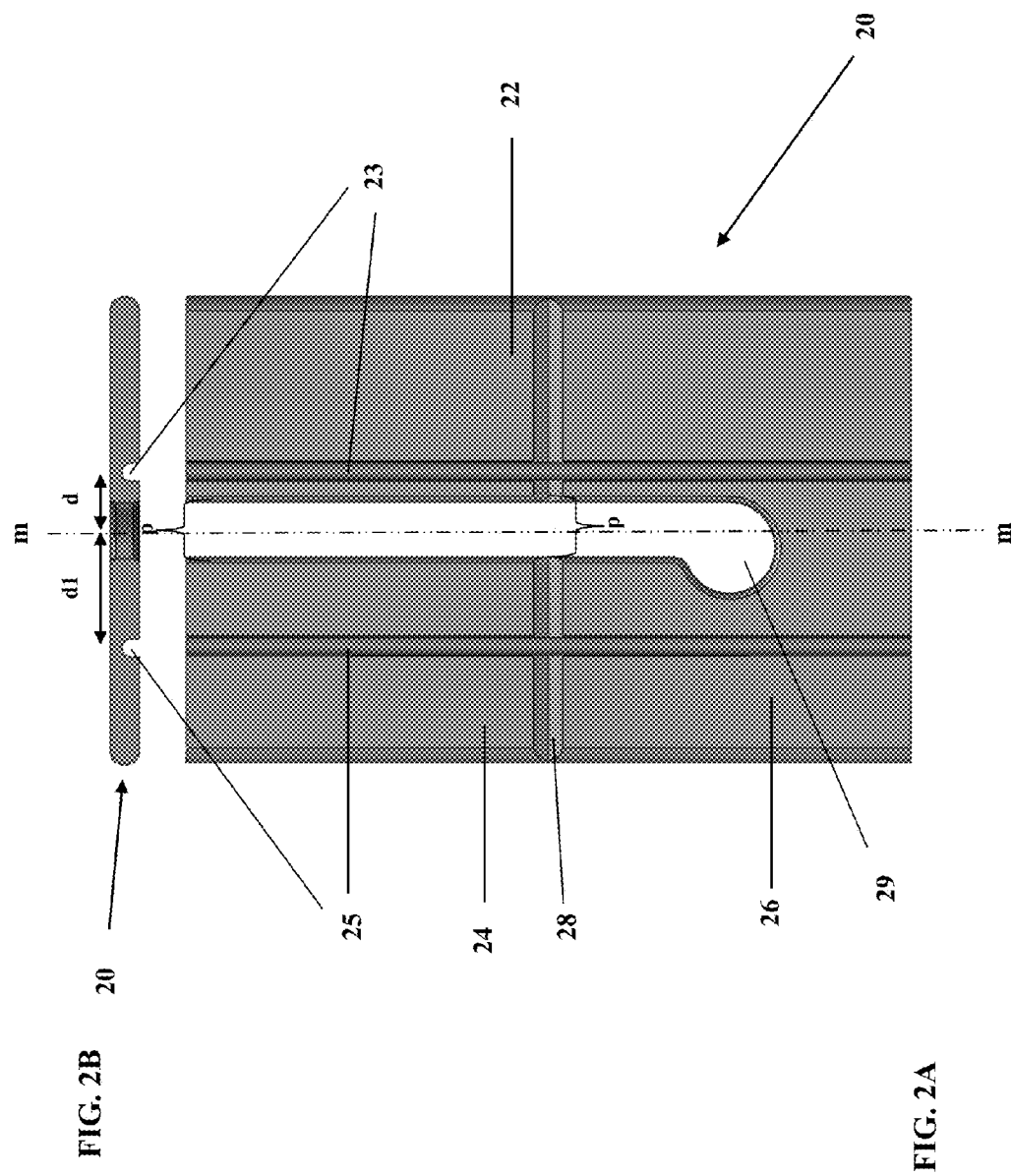
FIGS. 2A and 2B illustrate a mandrel according to the embodiment of the invention illustrated in FIG. 1.

FIGS. 2A and 2B illustrate a mandrel according to the exemplary embodiment of the invention illustrated in FIG. 1. The mandrel 20 is planar having two faces. The mandrel 20 has a positive portion 22 and a negative portion 24 with "p" separating the two portions. In addition, the mandrel 20 also has a removable portion 26 and a breakaway notch 28. Also shown are positive feedthrough groove 23 and negative feedthrough groove 25. Those of skill in the art will appreciate grooves 23 and 25 should be appropriately sized to accommodate the diameters of the feedthrough pins. The grooves can be in the shape of, for example, a "v", a rounded groove, or a square bottomed groove.

FIG. 2B is a top-plan view of mandrel 20 showing the mid-line of mandrel 20, along line 'm-m'. As illustrated in FIG. 2B, feedthrough grooves 23 and 25 are dimensioned and configured to accept feedthrough pins 42 and 44 (FIG. 1). In the embodiment illustrated in FIGS. 2A and 2B, positive feedthrough groove 23 is placed closer to midline 'm-m' of mandrel 20 than negative feedthrough groove 25. This is illustrated by the distance 'd' from positive electrode groove 23 to the midline compared to the distance from the negative electrode groove 25 to the midline 'm-m'. Of course, those of skill in the art will appreciate that the placement of the grooves can be equidistant from the midline. Alternatively, the negative feedthrough groove can be closer to the mid-line, if desired, or the grooves can be placed at any convenient location of the mandrel 20 as needed. However, those of skill in the art will appreciate that by having the feedthrough pins positioned at two different distances from the midline, a battery cover (not shown) can be constructed to fit over the electrodes (not shown) in only one position. This assures that the terminals can be easily identifiable as positive and negative.

Further, as shown in FIG. 2A, removable portion 26 can be separated from positive portion 22 and negative portion 24 by breakaway notch 28. Breakaway notch 28 can be deep enough such that mandrel 20 can be broken along the notch 28. This results in individual positive and negative portions 22 and 24 of mandrel 20. In some embodiments breakaway notch 28 is made in the mandrel 20 using electrical discharge machining (EDM). However, those of skill in the art will appreciate that breakaway notch 28 can be formed in the mandrel using various other techniques including machining, laser cutting, electrochemical machining (ECM), water jet cutting, milling etc. Also illustrated in FIG. 2A is an orientation notch 29 shown as a foot-type aperture on the midline of mandrel 20. In the embodiment shown, the "foot" points toward negative portion 24 of mandrel 20. Those of skill in the art will realize that such orientation guides are not necessary for mandrel 20 to function nor do they have to point towards the negative portion of the mandrel. However, such guides are helpful if consistently used.

Figure 3:
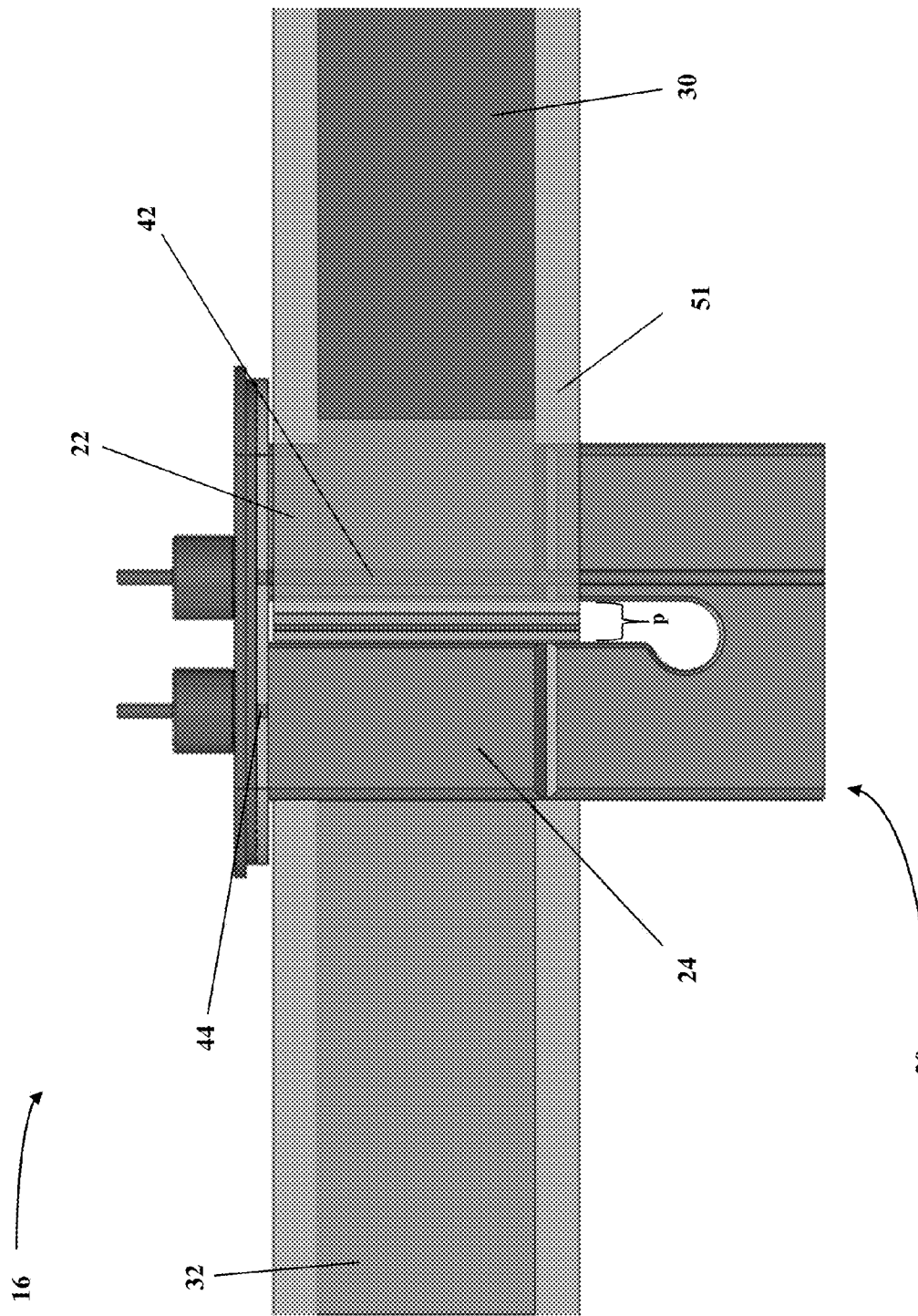
FIG. 3 is a schematic diagram of an electrode assembly made using another embodiment of the mandrel according to the invention. In this embodiment, the feed through pins are on opposite faces of the mandrel.

FIG. 3 shows another embodiment of an interconnect joint for an electrode assembly 16 according to the invention. In this embodiment, grooves for positive and negative feedthrough pins 42 and 44 are on opposite faces of mandrel 20. FIG. 3 also illustrates the conductive connection between mandrel 20, positive and negative feedthrough pins 42 and 44 and positive and negative electrodes 30 and 32. In the embodiment shown, positive and negative electrodes 30 and 32 are interposed between positive and negative feedthrough pins 42 and 44 in grooves 23 and 25 on positive and negative portions 22 and 24 of mandrel 20 respectively. When electrodes 30 and/or 32 are fixed in grooves 23 and/or 25 (not visible) by feedthrough pins 42 and/or 44 as shown a direct electric connection is established between feedthrough pins 42 and 44 and electrodes 30 and 32. In some embodiments, the connection can be secured by welding both feedthrough pins 42 and 44 and electrodes 30 and 32 into the grooves. Those of skill in the art will appreciate that when a direct connection between the electrodes 30 and 32 with feedthrough pins 42 and 44 is used, as shown in FIG. 3, grooves 23 and 25 (and electrodes 30 and 32) will need to be on opposite faces of mandrel 20 in order for separator 51 to be interposed between the electrodes when the electrodes a 30/32 are wrapped around mandrel 20 to form jelly roll assembly 16.

Those of skill in the art will appreciate that when the electrodes can be conductively connected directly to the feedthrough pins, the mandrel does not need to be conductive to establish the conductive interconnect joint. Therefore, in those embodiments of the invention where the mandrel does not need to be electrically conductive to complete the interconnect joint, the mandrel can be made from a non-electrically conductive material. Suitable electrically non-conductive materials can include polymers including polypropylene, polyethylene, and poly(ethylene-co-tetrafluoroethylene) (ETFE). Advantageously, the separator(s) can be heat sealed to the mandrel when the mandrel is prepared from a non-electrically conductive material. For example, an end of the separator can be attached to a portion of the mandrel via heat sealing.

Figure 4:
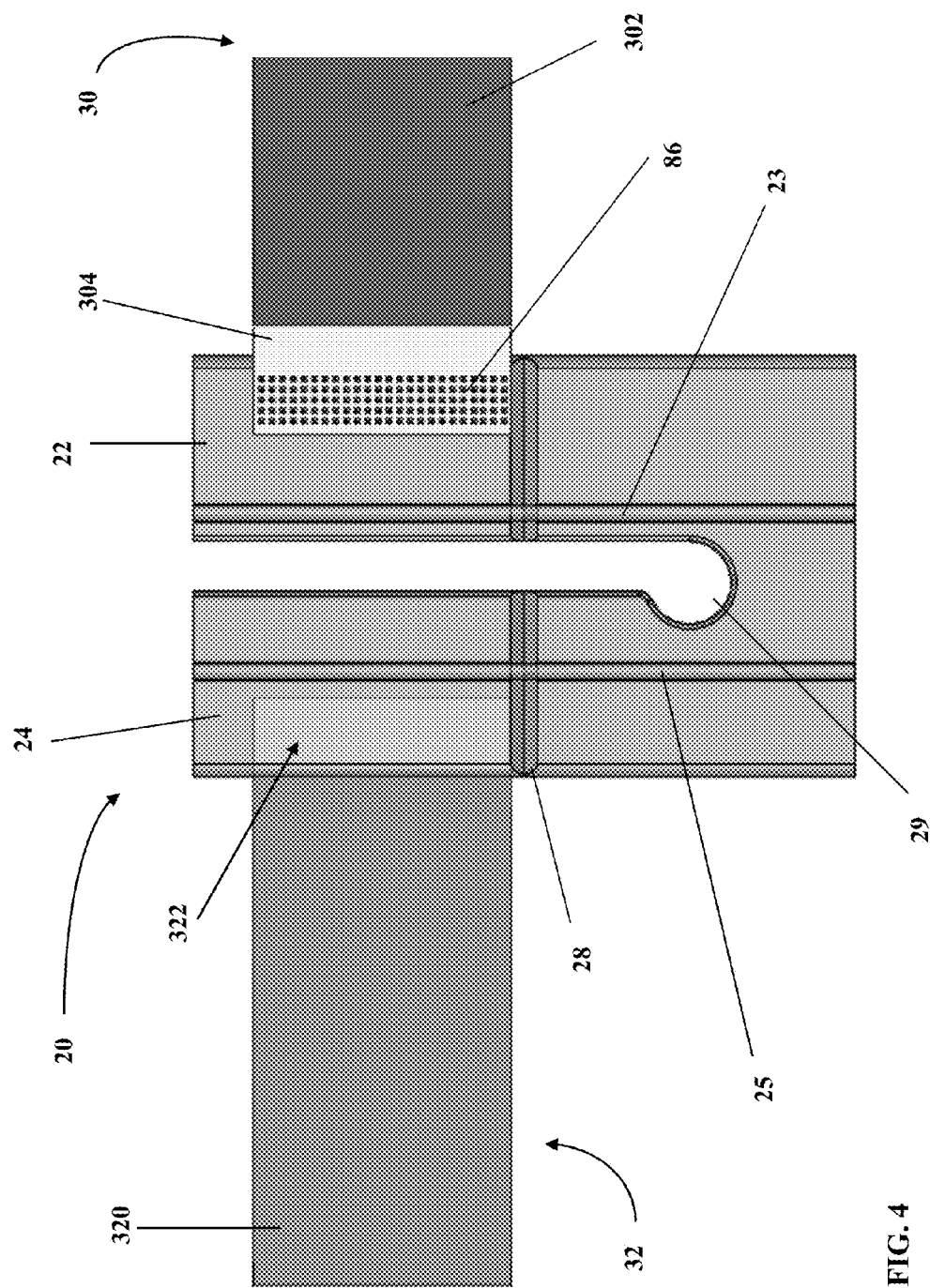
FIG. 4 is a schematic diagram of the mandrel illustrated in FIG. 1 with electrodes attached to the positive portion and the negative portion of the mandrel.

FIG. 4 is a schematic diagram illustrating mandrel 20 with electrodes 30 and 32 conductively connected to positive and negative portions 22 and 24. Electrodes 30 and 32 can be attached to opposite faces of mandrel 20.

Positive electrode 30 can be coated with a positive active material 302. As illustrated, positive electrode 30 has a proximal end 304 that is not coated with active material. Proximal end 304 can be attached at by an 86, such as by an ultrasonic weld, to positive portion 22 of mandrel 20. Similarly, negative electrode 32 can be coated with a negative active material 320. Proximal end 322 of negative electrode 21 is not coated with active material and facilitates attachment (not shown) to the negative portion 24 of mandrel 20. Electrodes 30 and 32 can be attached to the mandrel by welding such as, for example, laser welding, ultrasonic welding or resistance welding. In one embodiment, a combination of two or more welds can be included at the electrode and mandrel interface to effect attachment.

Those of skill in the art will appreciate that positive active material 302 can be any of those materials used as such in electrode technology. For example, positive active material 302 can be lithium cobalt oxide (rechargeable), carbon monofluoride ($CF_x$), silver vanadium oxide (primary), or combinations thereof. Similarly, negative active material 320 can be any appropriate negative active material used in electrode technology. Exemplary materials include lithium titanate, artificial graphite powder (MCMB), lithium, or combinations thereof.

Both positive 30 and negative electrodes 32 can be coated on one side or both sides of the electrode to provide an electron flow suitable to generate a current. However, those of skill in the art will appreciate that coating of the electrodes on both sides with active material allows for more efficient use of the two sides of the electrodes, resulting in increased energy and power in contrast to a single side coated electrode. It should be understood that the proximal and/or distal ends of the electrodes do not need to be coated on one or both sides. It should be appreciated that any suitable combination of coatings and coated portions of the electrode(s) is within the scope of the invention and is not limiting.

Figure 5:
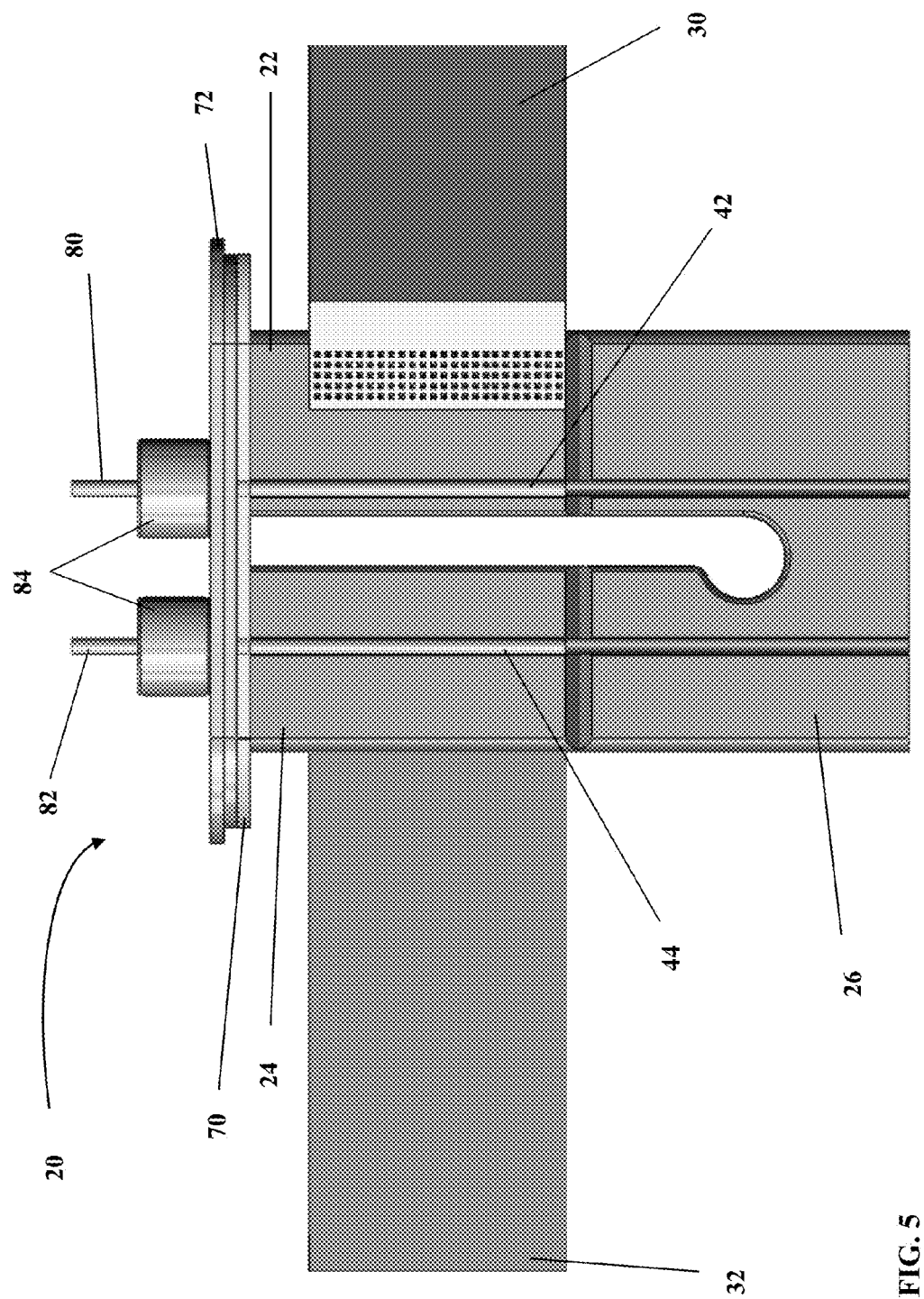
FIG. 5 is a schematic diagram of the mandrel shown in FIG. 4 with positive and negative feedthrough pins attached and a battery cap and insulator.

FIG. 5 illustrates electrodes 30 and 32 connected to mandrel 20, as shown in FIG. 4, with positive and negative feedthrough pins 42 and 44 placed in grooves 23 and 25 and secured in place. Feed through pins 42 and 44 and their respective electrodes 30 and 32 can be conductively connected to mandrel 20 by welding such as, for example, ultrasonic welding and/or laser welding. In the embodiment illustrated in FIG. 5, electrodes 30 and 32 are secured to mandrel 20 using ultrasonic welding.

Alternatively, in other embodiments, a direct conductive connection between the electrode and the feedthrough pin is made by attaching either or both positive electrode 30 and negative electrode 32 in grooves 23 and 25 underneath feedthrough pins 42 and 44 respectively prior to fixing feedthrough pins 42 and 44 in grooves 23 and 25. As discussed for FIG. 3, when electrodes 30 and/or 32 are fixed in grooves 23 and/or 25 by feedthrough pins 42 and/or 44 a direct electric connection is established between feedthrough pins 42 and 44 and electrodes 30 and 32.

FIG. 5 also illustrates feedthrough pins 42 and 44 extending through insulator 70 and battery cover 72 and used as battery terminals 80 and 82. Also shown are ferrules 84 which are welded to battery cover 72 to stabilize the terminals and isolate them from battery cover 72. A glass seal or sleeve (not shown) can be placed over the feedthrough pin prior to the placement of ferrule 84 to provide a seal between the feedthrough pin and the battery cover and insulating ferrule 84 from the feedthrough pin.

Suitable materials for ferrule construction can be titanium, vanadium, stainless steel and their alloys.

Insulator 70 can be made of any insulating material such as, for example, polyethylene, polypropylene, polyethylene terephthalate, polyimide, ethylene/tetrafluoroethylene copolymer (ETFE). In one aspect, the insulating material can be a non-conductive film such as, for example, DuPont Kapton® polyimide film.

As discussed above, in those embodiments where feedthrough pins 42 and 44 and electrodes 30 and 32 are directly connected to each other in feedthrough grooves 23 and 25 a direct electrical connection between the electrodes and the feedthrough pins is established. Therefore, mandrel 20 need not be electrically conductive to complete the interconnect joint. This is because direct connection of the electrodes to the feedthrough pins provides an electrical conduction between the electrodes, the feedthrough pins and battery terminals. Of course, those of skill in the art will appreciate that when electrodes 30, 32 are secured directly to mandrel 20, mandrel 20 must be electrically conductive.

Those of skill in the art can appreciate that under the above described conditions the battery case will be neutral. However, in other embodiments, a stud pin (not shown) can be welded to the battery cover concentric with groove 23 or 25 in which one of feedthrough pins 42 or 44 would be positioned. Thus, in this embodiment, the case will be at either a negative potential or a positive potential depending at which position the stud pin is secured.

Figure 6:
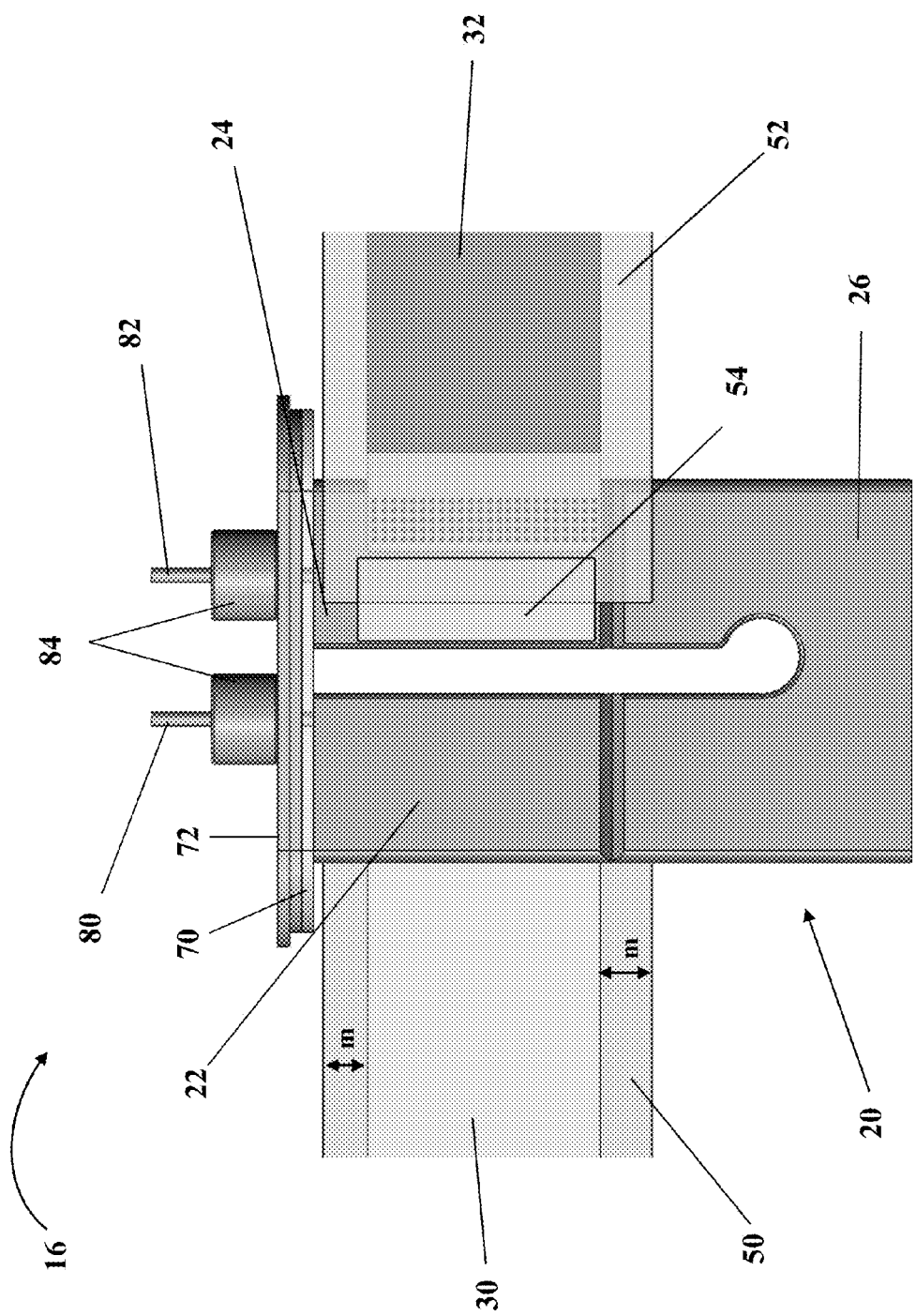
FIG. 6 illustrates the embodiment of a completed electrode assembly using the mandrel shown in FIG. 4 and with two separators attached. The view shown in FIG. 6 is from the opposite face as the view from FIG. 5.

FIG. 6 illustrates an electrode assembly as shown in FIG. 5 but viewed from the opposite face. In this embodiment, the electrode assembly has a first separator 50 and a second separator 52 attached to mandrel 20. As shown, first separator 50 and second separator 52 can be attached so as to be opposed to positive electrode 30 and negative electrode 32 respectively. When wound, separators 50 and 52 isolate positive and negative electrodes 30 and 32 from each other (shown in FIG. 7A). The separators can be attached to the mandrel 20 using any effective method. For example, the separators can be connected by adhesive or tape 54 that adheres the separator to the mandrel. Tape material 54 can be a polypropylene, polyethylene, polyester, or nylon resin. Adhesives include, for example, polyvinylidenefluoride (PVDF), co-polymers of polyhexafluoropropylene-polyvinylidenefluoride, poly(vinylacetate), polyvinylalcohol, polyethylene oxide, polyvinylpyrolidone, alkylated polyethylene oxide, polyvinyl ether, poly(methylmethacrylate), poly(ethylacrylate), polytetrafluoroethylene, polyvinylchloride, polyacrylonitrile, polyvinylpyridine, styrene-butadiene rubber, silicon and mixtures thereof.

FIG. 6 also shows that, as with the single separator 51 used in the embodiments shown in FIGS. 1 and 3, separators 50 and 52 are wider than electrodes 30 and 32 by a distance 'm'. Those of skill in the art will appreciate that, during the process of winding the electrode assembly, some telescoping of electrodes 30 and 32 may occur. Use of separators 50 and 52 that are wider than electrodes 30 and 32 helps to ensure that the electrodes do not contact each other in the jelly roll.

FIGS. 7A-7D are schematic, top-plan views of four separate embodiments of coiled jelly roll assemblies providing an interconnect joint according to the invention. FIGS. 7A and 7B are schematic diagrams of jelly roll assemblies incorporating an interconnect joint using two discrete separators while FIGS. 7C and 7D are schematic diagrams of jelly roll assemblies with interconnect joints using a single separator.

FIG. 7A shows mandrel 20 having positive and negative feedthrough pins 42 and 44 on the same face with electrodes 30 and 32 connected on opposite faces of mandrel 20. Uncoated portions 304 and 322 of electrodes 30 and 32 can be connected to positive 22 and negative 24 portions of mandrel 20 such as by welding as discussed for FIG. 5, above. Two separators 50 and 52 can be used to separate electrodes 30 and 32.

FIG. 7B provides an embodiment of the invention where positive and negative feedthrough pins 42 and 44 are on opposite faces of the mandrel. In this embodiment, uncoated portions 304 and 322 of positive and negative electrodes 30 and 32 are conductively connected to feedthrough pins 42 and 44 by being positioned in feedthrough grooves 23 and 25 behind feedthrough pins 42 and 44 making separate welding of electrodes 30 and 32 unnecessary. However, those of skill in the art will appreciate that in those embodiments of mandrel 20 where feedthrough pins 42 and 44 are located on opposite faces of mandrel 20, electrodes 30 32 need not be secured behind feedthrough pins 42 and 44 but may be secured directly to mandrel 20 such as, for example, by welding. In the embodiment shown in FIG. 7B, two separators, 50 and 52, are shown in FIG. 7B.

Once the components of the electrode assembly 16 are assembled, mandrel 20 can be rotated to wind electrodes 30 and 32 and separators 50 and 52 around mandrel 20 to create the jelly roll electrode assembly 16 as shown in FIGS. 7A and 7B. FIGS. 7A and 7B also illustrate mandrel 20 integrated into the center of the jelly roll electrode assembly 16 and separators 50 and 52 wound between the positive and negative electrodes 30 and 32 respectively.

FIGS. 7C and 7D illustrate separator 51 woven between positive and negative portions 22 and 24 of mandrel 20 to insulate positive 30 and negative 32 electrodes. FIG. 7C shows one embodiment of the interconnect joint wherein positive and negative feedthrough pins 42 and 44 can be on the same face of the mandrel 20. Uncoated portions 304 and 322 can be conductively connected to opposite faces of the mandrel 20, such as by welding as discussed for FIG. 5, separator 51 passes through passage 'p' (FIG. 3) of mandrel 20. FIG. 7D shows the interconnect joint where positive and negative feedthrough pins 42 and 44 can be on different faces of the mandrel 20. Uncoated portions 304 and 322 can be conductively connected to feedthrough pins 42 and 44 by positioning them in feedthrough grooves 23 and 25 behind feedthrough pins 42 and 44 creating a direct electrical connection between feedthrough pins 42 and 44 and electrodes 3 and 32 as previously discussed for FIG. 3.

As illustrated in FIGS. 7C and 7D, once the components of electrode assembly 16 are assembled, mandrel 20 can be rotated to wind the electrodes 30 and 32 and the single interwoven separator 51 around the mandrel to create the jelly roll electrode assembly 16. FIGS. 7C and 7D also illustrate mandrel 20 integrated into the center of the jelly roll electrode assembly 16 with separator 51 wound between the positive and negative electrodes 30 and 32 respectively.

Those of skill in the art will appreciate that, by positioning a single separator 51 through passage "p", the tension of the jelly roll maintains the separator 51 in place. The jelly roll can be wound with a desired tension without risk of the separator becoming dislodged from its position. In addition, those of skill in the art will further appreciate that, by use of the interconnect joint, whether a single separator is used or two different separators are used, there is no need for the placement of extraneous tabs to act as electrode terminals. The interconnect joint results in the ends of the feedthrough pins 42 and 44 being usable as positive and negative battery terminals 80 and 82. Therefore, extraneous tabs are not present that could damage the coiled jelly roll.

Rotating the mandrel to coil the jelly roll assembly can be accomplished by using the removable portion 26. Rotating the mandrel to wind or coil the jelly roll assembly can be performed manually. Alternatively, the process can be automated. For example, the removable portion 26 of mandrel 20 can be attached to a ligature or other holding mechanism (not shown) which can be turned by a motor. The mandrel 20 can be rotated and the process of coiling the jelly roll assembly 16 can be automated. Once wound, those of skill in the art will appreciate that any suitable means can be used to keep the electrodes in place once rolled. For example, simple insulating tape can be used such as, for example, Teflon, or polyimide tape such as, for example, DuPont Kapton®.

FIG. 8A shows the electrode assembly in battery case 64 before removable portion 26 is detached. As illustrated, battery case 64 is dimensioned so as to approximate the size of the mandrel without removable portion 26. As shown in FIG. 8B, separation of the removable portion results in individual positive portion 22 and negative portion 24 of mandrel 20 integrated into the jelly roll assembly 16 and battery 10. Jelly roll assembly 16 fits within battery case 64 as illustrated in FIG. 8B. Because positive portion 22 and negative portion 24 are not removed from the electrode assembly 16, telescoping of the jelly roll assembly due to their removal can be minimized or eliminated. Therefore, the jelly roll can be wound or coiled to a tension desired to accommodate the battery rather than coiling the jelly roll to a tension that allows the mandrel to be removed from the coil. Thus, the instant invention provides a less bulky electrode assembly and, consequently, can be used to provide a smaller battery.

Figure 9:
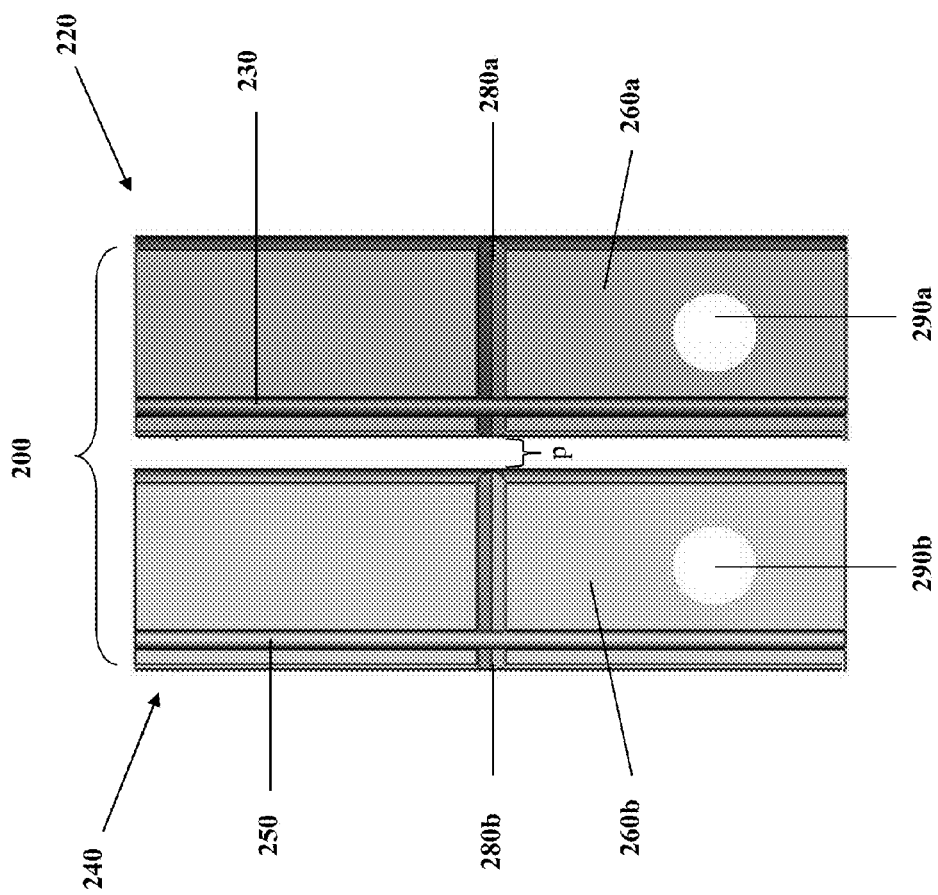
FIG. 9 is a schematic diagram of another embodiment of the mandrel according to the invention having two separate positive and negative portions, each with its own removable portion.

FIG. 9 illustrates a mandrel 200 according to the invention. Mandrel 200 includes a positive portion 220 and a negative portion 240. Both the positive portion 220 and the negative portion 240 include removable portions 260a and 260b, respectively. Positive portion 220 further includes a positive feedthrough groove 230 while the negative portion includes a negative feedthrough groove 250. As illustrated in FIG. 8, a breakaway notch 280a and 280b delineates the removable portion 260a and 260b from positive portion 220 and negative portion 240 of mandrel 200. Orientation notches 290a and 290b can be provided in removable portion 260a and 260b, respectively, of positive portion 220 and negative portion 240 of mandrel 200.

It should be understood that positive and negative electrodes (not shown) and feedthrough pins (not shown) can be attached to the positive and negative portions 200 and 240 of mandrel 200 as previously described herein. Additionally, it should be understood that feedthrough grooves 230 and 250 can be positioned on opposite sides of mandrel 200.

Two separators (not shown) can be attached to positive and negative portions 220 and 240 of mandrel 200 also as previously described. Alternatively, a single separator can be passed through passage "p" also as previously described to afford an electrode assembly.

During assembly, positive portion 220 and negative portion 240 can be held in place, for example, by a vice and grip winding ligature (not shown) connected to the removable portions 260a and 260b. As with the mandrel illustrated in FIG. 7B, once the jelly roll is coiled, the removable portions can be detached. Those of skill in the art will appreciate that the mandrel shown in FIG. 8 allows each positive portion 220 and negative portion 240 to be fabricated from different materials as needed, thereby optimizing the battery and battery chemistry for a desired use.

Figure 12:
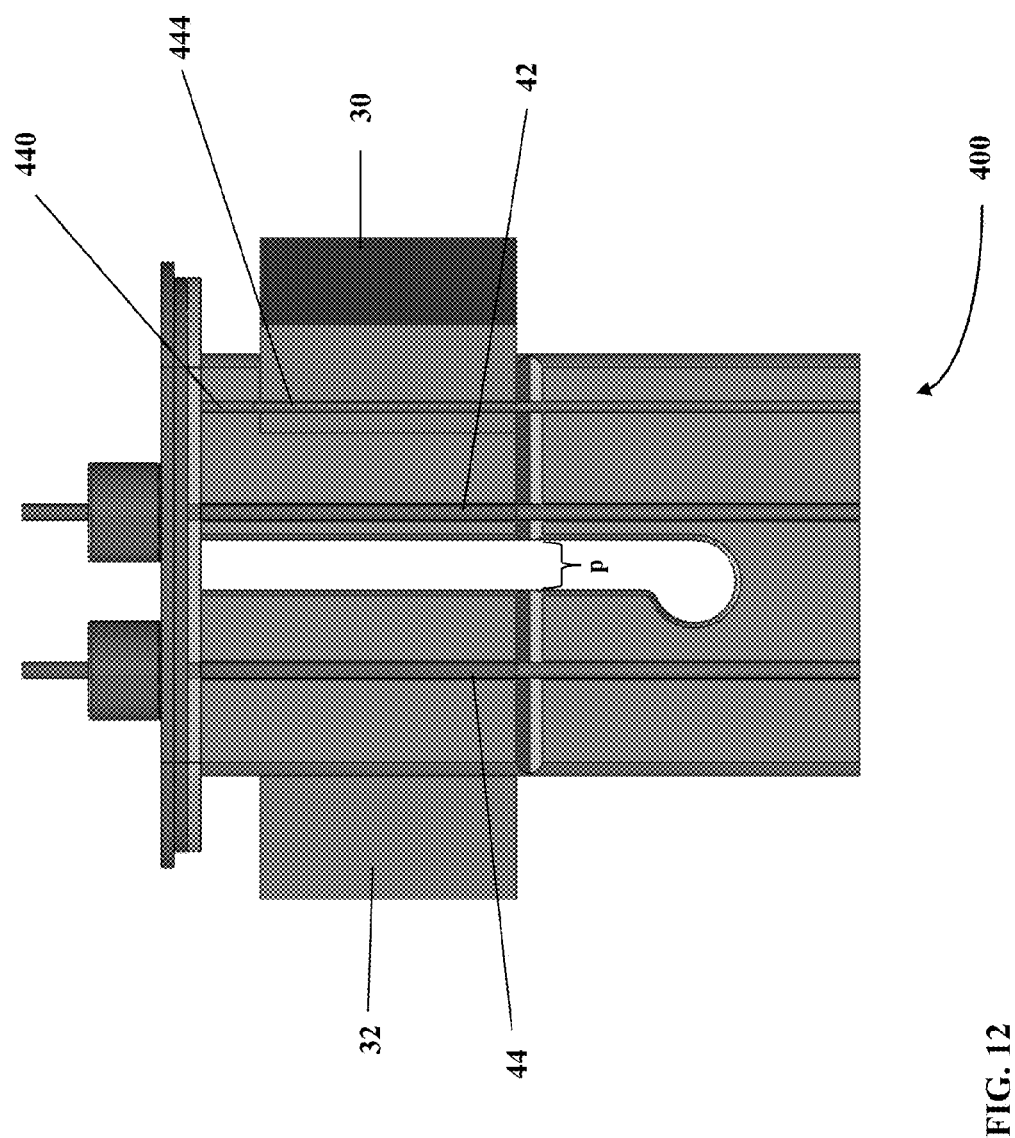
FIG. 12 is a side-plan view of a partially assembled electrode assembly according to one embodiment of the invention using the mandrel shown in FIGS. 10A and 10B.

FIGS. 10A and 10B illustrate another mandrel 300 according to the invention. FIG. 10A is a side-plan view showing a mandrel 300 with grooves 340 and 342 designed and configured for securing a stud pin (not shown) to the mandrel 300. Mandrel 300 also includes grooves 323 and 325 designed and configured to accept positive and negative feedthrough pins (not shown). Electrodes 30 and 32 (not shown) can be secured to mandrel 300 by stud pins (as shown in FIG. 12). For example, electrodes 30 and 32 can be placed into grooves 340 and 342. A stud pin can then be placed over the electrode and secured into the groove to effect attachment between positive portion 322 and negative portion 324 of mandrel 300. Stud pins can be made of any conductive or non-conductive material. As illustrated in FIGS. 10A and 10B, stud pin grooves 340 and 342 can be located on opposite faces of the mandrel. As with mandrel 20, illustrated in FIG. 2, mandrel 300 includes a positive portion 322, a negative portion 324 and a removable portion 326. Positive and negative portions 322 and 324 are adjacent to breakaway notch 328. Mandrel 300 also has positive and negative feedthrough grooves 323 and 325 dimensioned and configured to accept positive and negative feedthrough pins (not shown). In this embodiment, the grooves 323 and 325 are on opposite faces of the mandrel.

Positive and negative electrodes (not shown) and feedthrough pins (not shown) can be attached to the positive and negative portions 322 and 324 of mandrel 300 as previously described herein. Two separators (also not shown) can be attached to positive and negative portions 322 and 324 of mandrel 300 also as previously described. Alternatively, a single separator can be passed through passage "p" also as previously described to afford an electrode assembly.

FIGS. 11A and 11B illustrate another mandrel according to the invention. Mandrel 400 includes a positive portion 422, a negative portion 424 and a removable portion 426. Positive and negative portions 422 and 424 are adjacent to breakaway notch 428. As with mandrel 300, illustrated in FIGS. 10A and 10B, mandrel 400 is designed and configured for the electrodes (not shown) to be attached to mandrel 400 using a stud pin (444 shown in FIG. 12). As shown in FIG. 11A, mandrel 400 provides for positive stud pin groove 440, positive feedthrough pin groove 423 and negative feed through pin groove 425 to be on the same face of mandrel 400 while negative stud pin groove 442 is on the opposite face of the mandrel.

As with FIGS. 9, 10A and 10B, positive and negative electrodes (not shown) and feedthrough pins (not shown) can be attached to positive and negative portions 422 and 424 of mandrel 400 as previously described herein. Two separators (also not shown) can be attached to positive and negative portions 422 and 424 of mandrel 400 also as previously described. Alternatively, a single separator can be passed through passage "p" also as previously described to afford an electrode assembly.

FIG. 12 is a side-plan view of mandrel 400 (FIGS. 10A and 10B) partially assembled into an electrode assembly. FIG. 12 shows positive electrode 30 anchored underneath stud pin 444 in groove 440. Both electrode 30 and stud pin 444 can be connected to mandrel 400 together in groove 440 to provide conductive attachment of electrode 30 to mandrel 400 and through mandrel 400 to feedthrough pin 42 to create a conductive interconnect joint. Positive feedthrough pin 42 and negative feedthrough pin 44 are on the same face of the mandrel while negative electrode 32 can be connected to mandrel 400 using a stud pin (not shown) on the opposite face of the mandrel 400.

Two separators (also not shown) can be attached to positive and negative portions 422 and 424 of mandrel 400 also as previously described. Alternatively, a single separator can be passed through passage "p" also as previously described to afford an electrode assembly.

In an alternative embodiment, the mandrel can be made from a non-electrically conductive material. Such electrically non-conductive materials can include polymers including polypropylene, polyethylene, and poly(ethylene-co-tetrafluoroethylene) (ETFE). The mandrel can resemble mandrel 20 as illustrated in FIG. 3, such that there is a direct electrical connection between the electrodes and the feedthrough pins positioned in the mandrel.

Figure 13:
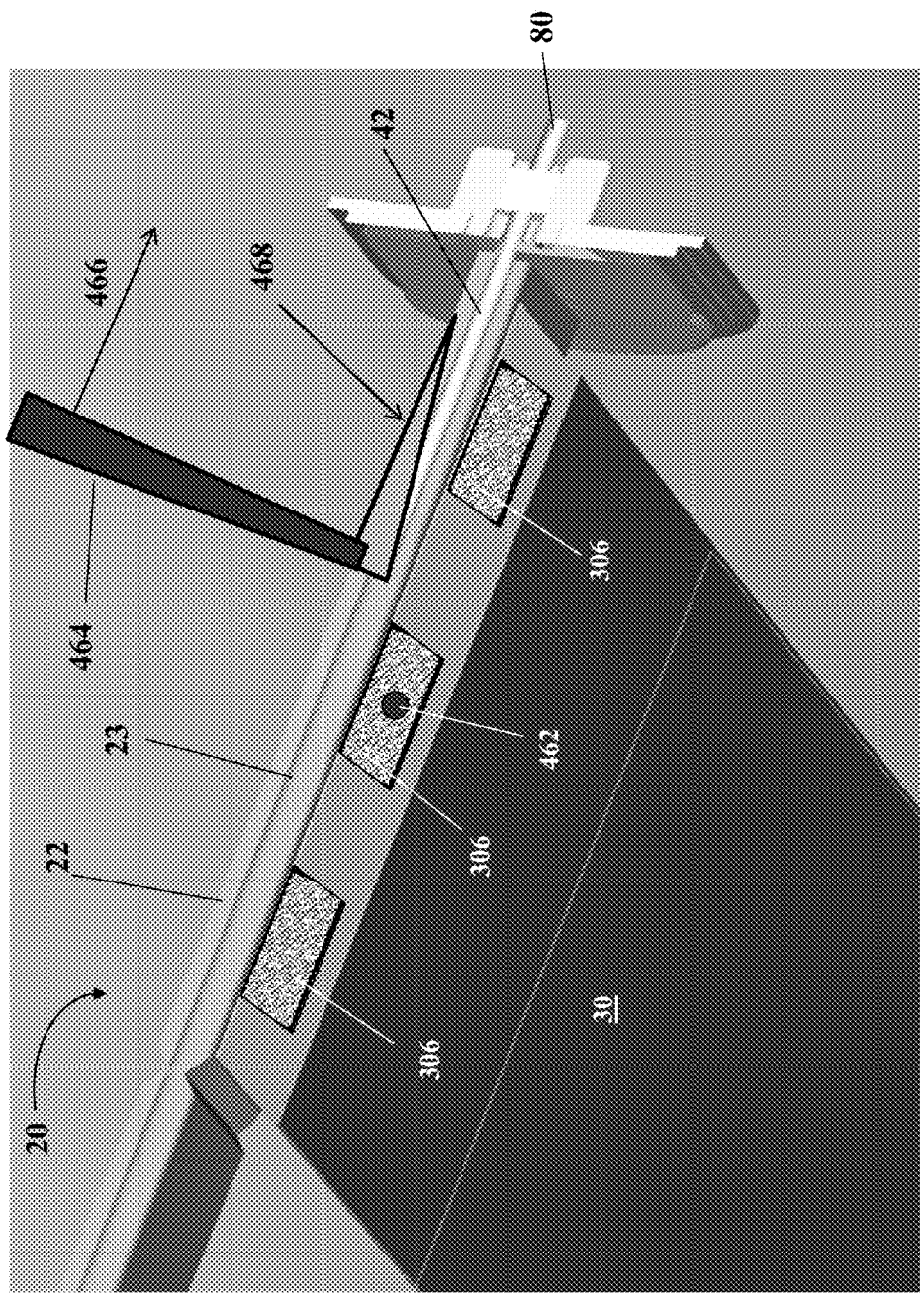
FIG. 13 is a side-plan view of a separate embodiment of an interconnect joint according to the invention. In this embodiment, the mandrel is welded to the feedthrough pins by a laser weld incident on the opposite face of the from that on which the feed through pin is fixed. In the embodiment of the mandrel shown the feedthrough pins are on opposite faces of the mandrel.

FIG. 13 is a schematic, cross-sectional representation of a through penetration weld of positive feedthrough pin 42 to one embodiment of mandrel 20. Those of skill in the art will appreciate that, in securing pins 42, 44 to mandrel 20, it is important to make the weld as robust as possible without damaging the integrity of mandrel 20 or pins 42, 44. To this end, the inventors have identified several advantageous strategies. As shown in FIG. 13, according to one embodiment, a laser beam 464 is used to make a through penetration weld of mandrel 20 to feedthrough pin 42 by making the laser incident on the face opposite of that from which groove 23 and pin 42 are located essentially welding the much larger mandrel 20 to feedthrough pins 42, 44 instead of pins 42, 44 to mandrel 20 insuring integrity of the weld and pins.

Therefore, in one exemplary embodiment, laser beam 464 travels in the direction of arrow 466 from a distal end of pin 42 (or 44) toward terminal 80 (or 82). In this embodiment laser beam 464 tracks from on-center of feedthrough pin 42 to off-center of feedthrough pin 42. This path is illustrated by the wedge-shaped weld penetration profile 468 which also represents the decreasing energy applied to pin 42 as laser 464 travels toward terminal 80 in direction of arrow 466. However, in various other embodiments, it is within the scope of the invention that the beam 464 maintains an on-center path while the power applied to pin 42/weld decreases as laser 464 travel along path 466 toward terminal 80.

Those of skill in the art will appreciate that power penetration profile 468 illustrates decreasing power of the laser from its initial point of incidence at the distal end of pin 42 as it travels along pin 42 toward terminal 80. The decrease in power penetration ensures that pins 42 and 44 are securely welded to mandrel 20 by the higher power at initial incidence and the integrity of pins 42 and 44 remains unaffected at the terminal end of laser path 466.

Through penetration welding of feedthrough pins 42, 44 from the opposite face of mandrel 20 provides certain benefits. First, it allows mandrel 20 to be welded to the feedthrough pins 42 and 44 instead of welding the feedthrough pins to mandrel 20. Those of skill in the art will appreciate that mandrel 20 being much larger and with a greater mass than feedthrough pins 42, 44 provides greater material for the weld than would welding of the feedthrough pins to the mandrel. Second, welding the mandrel 20 from the opposite face than grooves 23, 25 are located allows molten mandrel material to fill grooves 23, 25, around feedthrough pins 42, 44 with molten mandrel material, increasing the strength of the weld and eliminating any residual "air gap" between the feedthrough pins 42, 44 and the grooves 23, 25. Therefore, the strength of the weld is more robust than it would be if the smaller feedthrough pin was melted to form the weld.

Figure 14:
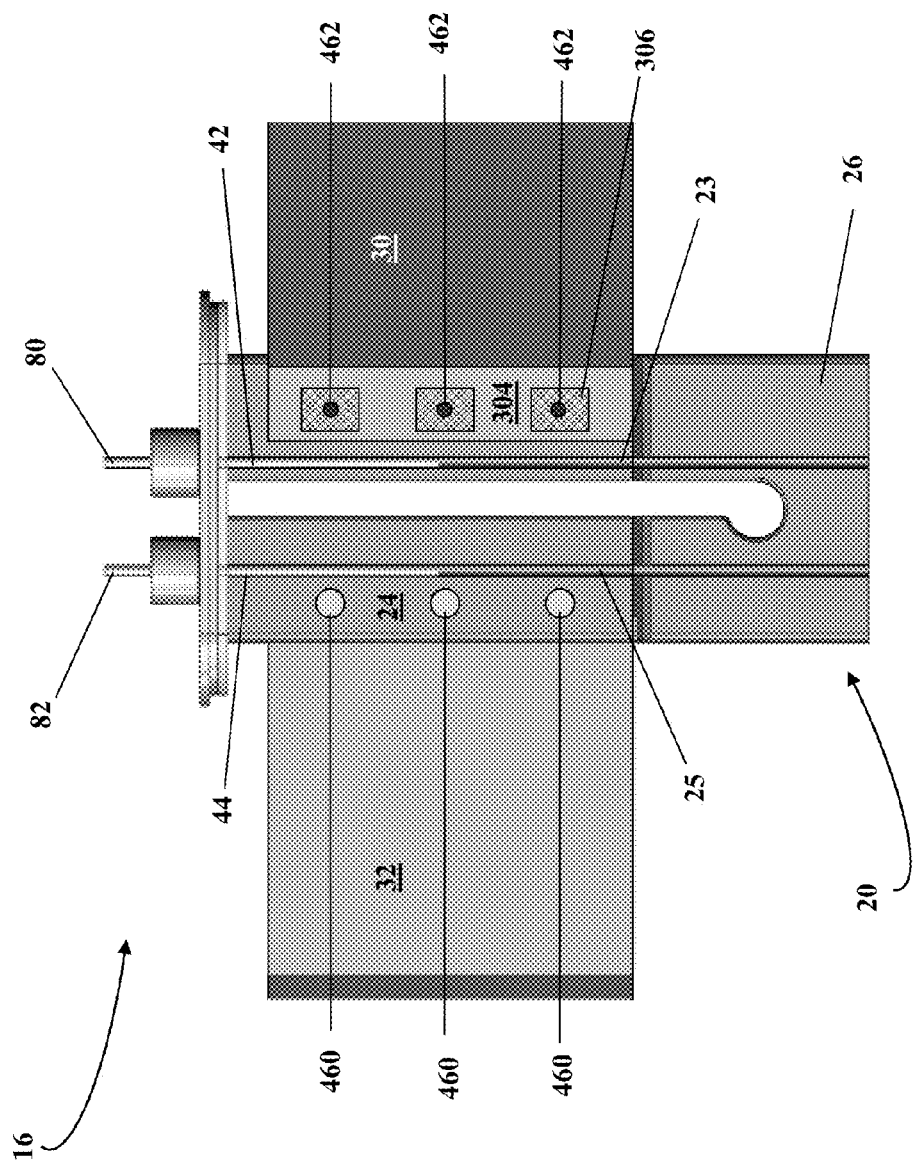
FIG. 14 is a schematic representation of a side-plan view of a hybrid weld used to attach one or both electrodes to the mandrel. In this view, an ultrasonic weld is used to attach the electrodes to opposite faces of the mandrel, this creates imprints of knurls or deformations on the electrode/mandrel interface. A laser weld, incident from the opposite face of the mandrel than the ultrasonic weld is then used to reinforce the ultrasonic weld assuring the connection.
Figure 15:
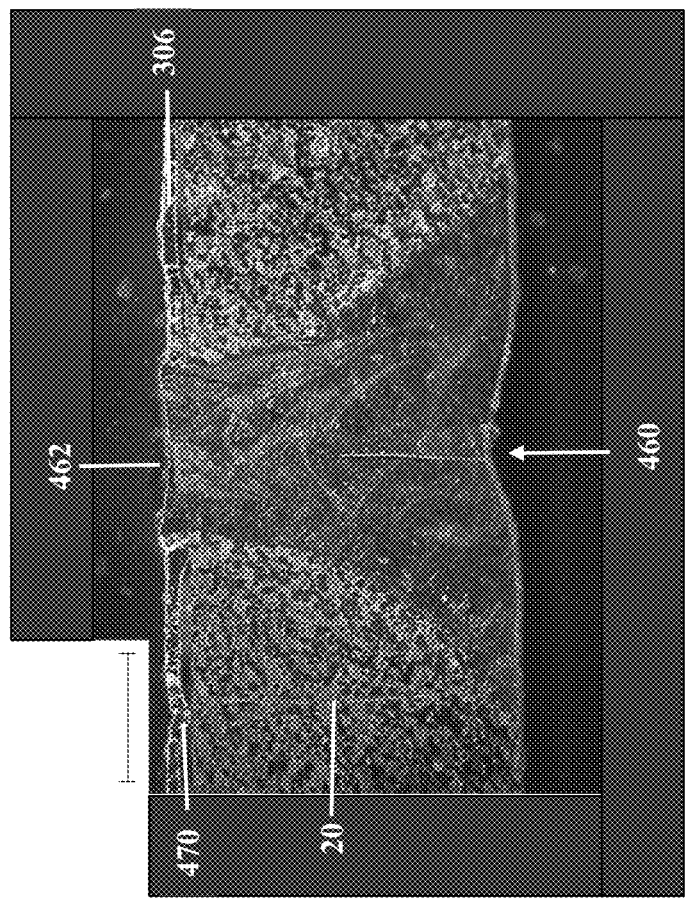
FIG. 15 is a micrograph of a laser weld with laser incident on the opposite face of the mandrel. Bar is $1^{-2}$ inch (0.25 mm).

As discussed below, the theoretical focal spot of the laser used in the embodiment illustrated in FIGS. 13-15 is approximately 0.016 in. (0.406 mm). In addition, FIG. 15 is micrograph showing a single incidence spot from a pulsed, through penetration weld. As shown, the side of the mandrel on which the laser is incident leaves a spot having a diameter of approximately 1.0 mm while on the opposite side of the mandrel, the weld spot is approximately 0.25 mm. As seen schematically in FIGS. 13 and 14 and shown in the micrograph, FIG. 15, while the through weld melts completely through the mandrel, the size of the weld spot, in relation to the size of the mandrel is small, in relation to the size of the mandrel, the weld spot is small and does not adversely affect the integrity of the mandrel. Of course, those of skill in the art will appreciate that the size of the focal spot and/or the power used and duration of pulse will change for different lasers used.

FIG. 14 is a side elevation view of one embodiment of mandrel 20 according to the invention. In this embodiment, both an ultrasonic weld 306 and a through penetration laser weld 462 create a hybrid weld 306/462 used to attach one or both electrodes 30/32 to mandrel 20. In the embodiment of electrode assembly 16 illustrated, feedthrough grooves 23, 25 and feedthrough pins 42, 44 are fixed to the same face of mandrel 20, as is the positive electrode 30. Negative electrode 32 is fixed to the opposite face of mandrel 20. In the embodiment shown, three ultrasonic welds 306 are used to attach each of the electrodes to mandrel 20 and each ultrasonic weld is reinforced with a through penetration laser weld 462 having a laser incidence point 460 on the opposite face of mandrel 20 than the electrodes 30, 32 are fixed on. However, in some embodiments, only one of the ultrasonic welds 306 is reinforced with a through penetration laser weld 462, as illustrated in FIG. 13.

Similarly, it is within the scope of the invention to reinforce only two of the ultrasonic welds with a through penetration laser weld. In addition, in some embodiments, only one of the electrodes is reinforced with a through penetration laser weld. For example, the positive electrode is more prone to corrosion from the electrolyte solution contained within the battery case (not shown) upon completion of the battery. Therefore, reinforcement of the negative electrode with a through penetration weld may not be required. However, in some instances a single through penetration weld of the positive electrode may be sufficient to overcome any concerns regarding the security of the positive electrode.

In various embodiments, ultrasonic weld 306 is made by the high frequency vibration of weld a weld plate (or horn and opposing anvil) (not shown) having a plurality of knurls that vibrate at high frequency against the electrode thereby welding it to the mandrel. In these embodiments, the imprint of the knurls into the electrode 30, 32 and the underlying mandrel 20, results in an increase in the surface area of the electrode 30, 32 in contact with the mandrel by a factor commensurate with the deformation of the knurls when compared to the flat electrode foil 304. In some embodiments, the frequency of vibration of the ultrasonic welding head may be from about 20 kHz to about 70 kHz. In other embodiments the vibration frequency may be about 40 kHz. Consequent through penetration by laser beam 464 of mandrel 20 at the location of ultrasonic weld 306 results in molten mandrel material flowing into the area between the horns of the knurls reinforcing attachment of the electrodes 30, 32 to the mandrel. In some embodiments the laser may be a solid state laser, such as, for example, a Trumpf Nd YAG-Laser HL 3006D. When solid state lasers are used the power can range from about 600 W to about 630 W peak with a pulse width of about approximately 17-17.5 mm. In these embodiments the energy use is about approximately 10-11.5 joules with a theoretical focus spot of approximately 0.016 in (0.406 mm). Of course, those of skill in the art will appreciate that use of different lasers may require different parameters to achieve through penetration of mandrel 20 without destruction of the underlying electrode foil 304.

Those of skill in the art will appreciate that while three discrete ultrasonic welds 306 are illustrated for each electrode 30/32, in some embodiments, a single ultrasonic weld may be used such as for example ultrasonic weld 86 shown in FIG. 4. When a single weld is used one or more through penetration laser welds 462 may also be used. In addition, in the embodiment illustrated in FIG. 14, the ultrasonic welding head has a horn density of 3×39 knurl points. To make the weld the welding head can generally vibrate between about approximately 20 kHz to about approximately 60 kHz.

FIG. 15 is an electron micrograph of a cross section of mandrel 20 showing a through penetration weld of mandrel 20 from laser incidence 460 to laser weld 462 and impacting electrode foil 306. Knurls 470 made by made ultrasonic weld are visible in this view. Bar is $1^{-2}$ inch (0.25 mm).

The following paragraphs enumerated consecutively from 1 through 35 provide for various aspects of the present invention. In one embodiment, in a first paragraph (1), the present invention provides:

1. An electrode assembly comprising:
   a mandrel having a first face and a second face, comprising
      a positive portion, a negative portion and one or more removable portions;
   a positive electrode;
   a negative electrode;
   a positive feedthrough pin; and
   a negative feedthrough pin;
wherein the positive portion and the negative portion are connected by one or more removable portions;
wherein the positive feedthrough pin is connected to the positive portion and the negative feedthrough pin is connected to the negative portion;
wherein the positive electrode is attached to the positive portion and the negative electrode is attached to the negative portion;
wherein one or both electrodes are connected to the mandrel by one or more ultrasonic welds from the same face of the mandrel to which the one or both electrodes are attached; and
wherein one or both electrodes are connected to the mandrel by one or more laser welds from the opposite face of the mandrel from which the one or both electrodes are attached.

2. The electrode assembly of paragraph 1, wherein the ultrasonic weld provides one or more knurls.

3. The electrode assembly of paragraph 1 or 2, wherein the laser weld is formed about the one or more knurls.

4. The electrode assembly of any of paragraphs 1 through 3, wherein the positive portion and/or the negative portion have a groove configured to accept the feedthrough pins.

5. The electrode assembly of any of paragraphs 1 through 4, wherein the positive and negative feedthrough pins are independently selected from steel, platinum, aluminum, titanium, vanadium, niobium, molybdenum, platinum-iridium, and copper and their alloys.

6. The electrode assembly of any of paragraphs 1 through 5, wherein the positive and negative electrodes are independently selected from aluminum, steel, silver, copper, nickel, titanium, vanadium or alloys thereof 7. The electrode assembly of any of paragraphs 1 through 6, wherein the positive electrode is coated with a positive active material selected from lithium cobalt oxide (rechargeable), carbon monofluoride (CFx), silver vanadium oxide (primary), or combinations thereof.

8. The electrode assembly of any of paragraphs 1 through 7, wherein the negative electrode is coated with a negative active material selected from lithium titanate, artificial graphite powder (MCMB), lithium or combinations thereof 9. The electrode assembly of any of paragraphs 1 through 8, wherein the mandrel is formed from an electrically conductive material selected from stainless steel, aluminum, titanium, vanadium, nickel, copper their alloys and combinations thereof.

10. The electrode assembly of paragraph 10, wherein the positive electrode, the negative electrode, or both is/are interposed in the groove between the positive feedthrough pin or negative feedthrough pin and the mandrel.

11. The electrode assembly of any of paragraphs 1 through 10, wherein a passage is interposed between the positive and the negative portions.

12. The electrode assembly of paragraph 11, wherein a separator strip is passed through the passage.

13. The electrode assembly of paragraph 12, wherein the electrodes and the separator strip are wound around the mandrel.

14. The electrode assembly of any of paragraphs 1 through 13, wherein the one or more removable portions are detached.

15. A method of preparing an electrode assembly comprising:
   providing a mandrel having a first face and a second face and comprising a positive portion and a negative portion connected by one or more removable portions;
   providing a positive electrode;
   providing a negative electrode;
   providing a positive feedthrough pin;
   providing a negative feedthrough pin;
   connecting the positive feedthrough pin to the positive portion and the negative feedthrough pin to the negative portion;
   attaching the positive electrode to a face of the positive portion by ultrasonic welding from the same face of the mandrel to which the electrode is attached;
   attaching the negative electrode to a face of the negative portion by ultrasonic welding from the same face of the mandrel to which the electrode is attached; and
   attaching the positive electrode, the negative electrode or both to a face of the positive portion and/or the negative portion respectively by laser welding from the opposite face of the mandrel to which the electrode is attached.

16. A method of preparing an electrode assembly of paragraph 15, wherein the ultrasonic welding provides one or more knurls.

17. A method of preparing an electrode assembly of paragraph 16, wherein the laser welding provides molten mandrel material about the one or more knurls.

18. The method of preparing an electrode assembly of any of paragraphs 15 through 17, further comprising the step of providing a groove configured to accept the positive feedthrough pin on the positive portion on a face of the mandrel.

19. The method of preparing an electrode assembly of paragraph 18, wherein the positive feedthrough pin is conductively connected in the groove on the positive portion.

20. The method of preparing an electrode assembly of any of paragraphs 15 through 19, further comprising the step of, providing a groove configured to accept the negative feedthrough pin on the negative portion on a face of the mandrel.

21. The method of preparing an electrode assembly of paragraph 20, wherein the negative feedthrough pin is conductively connected in the groove on the negative portion.

22. The method of preparing an electrode assembly of any of paragraphs 15 through 21, wherein the positive and negative feedthrough pins are independently selected from steel, platinum, aluminum, titanium, vanadium, niobium, molybdenum, platinum-iridium, and copper and their alloys.

23. The method of preparing an electrode assembly of any of paragraphs 15 through 22, wherein the positive and negative electrodes are independently selected from aluminum, steel, silver, copper, nickel, titanium, vanadium, or alloys thereof 24. The method of preparing an electrode assembly of paragraph 23, wherein the positive electrode is coated with a positive active material selected from lithium cobalt oxide (rechargeable), carbon monofluoride (CFx), silver vanadium oxide (primary), or combinations thereof.

25. The method of preparing an electrode assembly of paragraph 23, wherein the negative electrode is coated with a negative active material selected from lithium titanate, artificial graphite powder (MCMB), lithium, or combinations thereof.

26. The method of preparing an electrode assembly of any of paragraphs 15 through 25, wherein the mandrel is farmed from an electrically conductive material selected from stainless steel, aluminum, titanium, vanadium, nickel, copper, their alloys or combinations thereof.

27. The method of preparing an electrode assembly of any of paragraphs 15 through 26, wherein the positive electrode, the negative electrode, or both is/are interposed in the groove between the positive feedthrough pin or negative feedthrough pin and the mandrel.

28. The method of preparing an electrode assembly of any of paragraphs 15 through 27, further including passing a separator strip through a passage between the positive and the negative portions.

29. The method of preparing an electrode assembly of paragraph 28, further including winding the electrodes and the separator strip around the mandrel.

30. The method of preparing an electrode assembly of paragraph 29, wherein winding is accomplished by rotating the mandrel.

31. The method of preparing an electrode assembly of paragraph 30, further comprising the step of detaching the one or more removable portions.

32. The electrode assembly of any of paragraphs 1 through 14, wherein the mandrel is planar.

33. The method of preparing an electrode assembly of any of paragraphs 15 through 31, wherein the mandrel is planar.

34. The method of preparing an electrode assembly of any of paragraphs 15 through 31 and 33, wherein either the laser welding or the ultrasonic welding can be performed first.

35. The method of preparing an electrode assembly of paragraph 34, wherein the order of attaching the positive electrode or the negative electrode can be in any order.

While this invention has been described in conjunction with the various exemplary embodiments outlined above, various alternatives, modifications, variations, improvements and/or substantial equivalents, whether known or that are or may be presently unforeseen, may become apparent to those having at least ordinary skill in the art. Accordingly, the exemplary embodiments according to this invention, as set forth above, are intended to be illustrative not limiting. Various changes may be made without departing from the spirit and scope of the invention. Therefore, the invention is intended to embrace all known or later-developed alternatives, modifications, variations, improvements and/or substantial equivalents of these exemplary embodiments.

What is claimed is:
1. An electrode assembly comprising:
   a mandrel having a first face and a second face, comprising a positive portion, a negative portion, a breakaway notch and one or more removable portions adjacent to the breakaway notch;
   a positive electrode;
   a negative electrode;

a positive feedthrough pin; and
a negative feedthrough pin;
wherein the positive portion and the negative portion are connected by one or more removable portions;
wherein the positive feedthrough pin is connected to the positive portion and the negative feedthrough pin is connected to the negative portion;
wherein the positive electrode is attached to the positive portion and the negative electrode is attached to the negative portion;
wherein one or both electrodes are connected to the mandrel by one or more ultrasonic welds from the same face of the mandrel from which the one or both electrodes are attached; and
wherein one or both electrodes are connected to the mandrel by one or more laser welds from an opposite face of the mandrel to which the one or both electrodes are attached.

2. The electrode assembly of claim 1, wherein an ultrasonic weld provides one or more knurls.

3. The electrode assembly of claim 1, wherein a laser weld is formed about one or more knurls.

4. The electrode assembly of claim 1, wherein the positive portion and/or the negative portion have a groove configured to accept the feedthrough pins.

5. The electrode assembly of claim 1, wherein the positive and negative feedthrough pins are independently selected from steel, platinum, aluminum, titanium, vanadium, niobium, molybdenum, platinum-iridium, and copper and their alloys.

6. The electrode assembly of claim 1, wherein the positive and negative electrodes are independently selected from aluminum, steel, silver, copper, nickel, titanium, vanadium or alloys thereof.

7. The electrode assembly of claim 1, wherein the positive electrode is coated with a positive active material selected from lithium cobalt oxide, carbon monofluoride, silver vanadium oxide, or combinations thereof.

8. The electrode assembly of claim 1, wherein the negative electrode is coated with a negative active material selected from lithium titanate, artificial graphite powder, lithium or combinations thereof.

9. The electrode assembly of claim 1, wherein the mandrel is formed from an electrically conductive material selected from stainless steel, aluminum, titanium, vanadium, nickel, copper, their alloys or combinations thereof.

10. The electrode assembly of claim 1, wherein the positive electrode, the negative electrode, or both is/are interposed in the groove between the positive feedthrough pin or negative feedthrough pin and the mandrel.

11. The electrode assembly of claim 1, wherein a passage is interposed between the positive and the negative portions.

12. The electrode assembly of claim 11, wherein a separator strip is passed through the passage.

13. The electrode assembly of claim 12, wherein the electrodes and the separator strip are wound around the mandrel.

14. A method of preparing an electrode assembly according to claim 1, comprising:
providing a mandrel having a first face and a second face and comprising a positive portion and a negative portion connected by one or more removable portions that are separated by the breakaway notch;
providing a positive electrode;
providing a negative electrode;
providing a positive feedthrough pin;
providing a negative feedthrough pin;
connecting the positive feedthrough pin to the positive portion and the negative feedthrough pin to the negative portion;
attaching the positive electrode to a face of the positive portion by ultrasonic welding from the same face of the mandrel to which the electrode is attached;
attaching the negative electrode to a face of the negative portion by ultrasonic welding from the same face of the mandrel to which the electrode is attached; and
attaching the positive electrode, the negative electrode or both to a face of the positive portion and/or the negative portion respectively by laser welding from an opposite face of the mandrel to which the electrode is attached.

15. A method of preparing an electrode assembly of claim 14, wherein ultrasonic welding provides one or more knurls.

16. A method of preparing an electrode assembly of claim 15, wherein laser welding provides molten mandrel material about the one or more knurls.

17. The method of preparing an electrode assembly of claim 14, further comprising the step of providing a groove configured to accept the positive feedthrough pin on the positive portion on a face of the mandrel.

18. The method of preparing an electrode assembly of claim 17, wherein the positive feedthrough pin is conductively connected in the groove on the positive portion.

19. The method of preparing an electrode assembly of claim 14, further comprising the step of, providing a groove configured to accept the negative feedthrough pin on the negative portion on a face of the mandrel.

20. The method of preparing an electrode assembly of claim 19, wherein the negative feedthrough pin is conductively connected in the groove on the negative portion.

21. The method of preparing an electrode assembly of claim 14, wherein the positive and negative feedthrough pins are independently selected from steel, platinum, aluminum, titanium, vanadium, niobium, molybdenum, platinum-iridium, copper and alloys thereof.

22. The method of preparing an electrode assembly of claim 14, wherein the positive and negative electrodes are independently selected from aluminum, steel, silver, copper, nickel, titanium, vanadium, and alloys thereof.

23. The method of preparing an electrode assembly of claim 22, wherein the positive electrode is coated with a positive active material selected from lithium cobalt oxide, carbon monofluoride, silver vanadium oxide, or combinations thereof.

24. The method of preparing an electrode assembly of claim 22, wherein the negative electrode is coated with a negative active material selected from lithium titanate, artificial graphite powder, lithium, or combinations thereof.

25. The method of preparing an electrode assembly of claim 14, wherein the mandrel is formed from an electrically conductive material selected from stainless steel, aluminum, titanium, vanadium, nickel, copper, and alloys thereof.

26. The method of preparing an electrode assembly of claim 14, wherein the positive electrode, the negative electrode, or both is/are interposed in the groove between the positive feedthrough pin or negative feedthrough pin and the mandrel.

27. The method of preparing an electrode assembly of claim 14, further including passing a separator strip through a passage between the positive and the negative portions.

28. The method of preparing an electrode assembly of claim 27, further including winding the electrodes and the separator strip around the mandrel.

29. The method of preparing an electrode assembly of claim 28, wherein winding is accomplished by rotating the mandrel.

30. The method of preparing an electrode assembly of claim 29, further comprising the step of detaching the one or more removable portions.

31. The method of preparing an electrode assembly of claim 14, wherein the mandrel is planar.

32. The method of preparing an electrode assembly of claim 14, wherein either the laser welding or the ultrasonic welding can be performed first.

33. The method of preparing an electrode assembly of claim 32, wherein the order of attaching the positive electrode or the negative electrode can be in any order.

* * * * *